(12) United States Patent
Derzhi et al.

(10) Patent No.: US 9,047,513 B2
(45) Date of Patent: Jun. 2, 2015

(54) METHOD FOR IMPROVING THE ACCURACY OF ROCK PROPERTY VALUES DERIVED FROM DIGITAL IMAGES

(71) Applicant: Ingrain, Inc., Houston, TX (US)

(72) Inventors: Naum Derzhi, Houston, TX (US); Jack Dvorkin, Houston, TX (US); Qian Fang, Houston, TX (US); Michael Suhrer, Houston, TX (US)

(73) Assignee: Ingrain, Inc., Houston, TX (US)

( * ) Notice: Subject to any disclaimer, the term of this patent is extended or adjusted under 35 U.S.C. 154(b) by 120 days.

(21) Appl. No.: 13/962,041

(22) Filed: Aug. 8, 2013

(65) Prior Publication Data

US 2014/0044315 A1     Feb. 13, 2014

Related U.S. Application Data

(60) Provisional application No. 61/681,700, filed on Aug. 10, 2012.

(51) Int. Cl.
    *G06K 9/00*           (2006.01)
    *G06T 7/00*           (2006.01)

(52) U.S. Cl.
    CPC .......... *G06K 9/00624* (2013.01); *G06T 7/0004* (2013.01); *G06T 7/0081* (2013.01); *G06T 2207/10081* (2013.01); *G06T 2207/20152* (2013.01); *G06T 2207/30108* (2013.01); *G06T 2207/20041* (2013.01)

(58) Field of Classification Search
    USPC .................................. 382/128–134, 173–180
    See application file for complete search history.

(56) References Cited

U.S. PATENT DOCUMENTS

| | | | | |
|---|---|---|---|---|
| 4,722,095 | A | * | 1/1988 | Muegge et al. .................... 378/4 |
| 6,516,080 | B1 | | 2/2003 | Nur |
| 6,697,510 | B2 | * | 2/2004 | Moshe .......................... 382/133 |
| 6,728,314 | B2 | | 4/2004 | Kan et al. |
| 6,947,591 | B2 | | 9/2005 | Risson |
| 6,956,961 | B2 | | 10/2005 | Cong et al. |

(Continued)

FOREIGN PATENT DOCUMENTS

EP          2090907 A1      8/2009

OTHER PUBLICATIONS

Tölke, J., et al., "Computer Simulations of fluid flow in sediment: From images to permeability," The Leading Edge, Jan. 2010, pp. 68-70 and 72-74.

(Continued)

*Primary Examiner* — Alex Liew
(74) *Attorney, Agent, or Firm* — Kilyk & Bowersox, P.L.L.C.

(57) ABSTRACT

A method for increasing the accuracy of a target property value derived from a rock sample is described in which the sample is scanned to obtain a three-dimensional tomographic digital image which can be processed to pore space and solid material phases through a segmentation process. A process is used which revises the segmented volume, e.g., by increasing pore space connectivity, in a manner affecting the target property value that would be derived. Another described method increases the accuracy with which a segmented volume represents a material sample having structure not adequately resolved in an original three-dimensional tomographic digital image. Further, a system for performing the processes, and a segmented digital volume which more accurately represents a sample of a porous media, are described.

41 Claims, 9 Drawing Sheets

(56) References Cited

U.S. PATENT DOCUMENTS

| | | | |
|---|---|---|---|
| 7,327,880 | B2 | 2/2008 | Tek |
| 7,333,646 | B2 | 2/2008 | Cathier et al. |
| 8,081,796 | B2 | 12/2011 | Derzhi et al. |
| 8,081,802 | B2 | 12/2011 | Dvorkin et al. |
| 8,085,974 | B2 | 12/2011 | Dvorkin et al. |
| 8,155,377 | B2 | 4/2012 | Dvorkin et al. |
| 8,170,799 | B2 | 5/2012 | Dvorkin et al. |
| 8,331,626 | B2 | 12/2012 | Wojcik et al. |
| 2007/0098242 | A1* | 5/2007 | Wiemker et al. ............. 382/131 |
| 2009/0288880 | A1* | 11/2009 | Wojcik et al. ................ 175/50 |
| 2010/0128932 | A1* | 5/2010 | Dvorkin et al. ............. 382/109 |
| 2010/0128933 | A1* | 5/2010 | Derzhi et al. ............... 382/109 |
| 2010/0128982 | A1* | 5/2010 | Dvorkin et al. ............. 382/171 |
| 2010/0131204 | A1* | 5/2010 | Dvorkin et al. ................ 702/6 |
| 2010/0135536 | A1* | 6/2010 | Dvorkin et al. ............. 382/109 |
| 2011/0295580 | A1* | 12/2011 | Sisk et al. ................... 703/10 |
| 2012/0281883 | A1* | 11/2012 | Hurley et al. ............... 382/109 |
| 2013/0013209 | A1* | 1/2013 | Zhu et al. ...................... 702/6 |
| 2013/0018641 | A1 | 1/2013 | De Prisco et al. |
| 2013/0028371 | A1 | 1/2013 | Derzhi |
| 2013/0073207 | A1 | 3/2013 | Ganz |
| 2013/0094716 | A1* | 4/2013 | Carpio et al. ............... 382/109 |
| 2013/0182819 | A1 | 7/2013 | Dvorkin et al. |
| 2013/0259190 | A1 | 10/2013 | Walls et al. |
| 2013/0262028 | A1 | 10/2013 | De Prisco et al. |
| 2013/0308831 | A1* | 11/2013 | Dvorkin et al. ............. 382/109 |
| 2013/0338976 | A1* | 12/2013 | De Prisco et al. ............. 703/2 |
| 2014/0019054 | A1* | 1/2014 | De Prisco et al. ............ 702/12 |
| 2014/0052420 | A1* | 2/2014 | Cavanaugh ................... 703/2 |
| 2014/0086381 | A1* | 3/2014 | Grader et al. .................. 378/4 |

OTHER PUBLICATIONS

Dvorkin, J., et al., "Relevance of computational rock physics," Geophysics, vol. 76, No. 5, Sep.-Oct. 2011, pp. E141-E153.

Dvorkin, J., et al., "From micro to reservoir scale: Permeability from digital experiments," The Leading Edge, vol. 28, No. 12, Dec. 2009, pp. 1446-1448 and 1450-1453.

Knackstedt, M. A., et al., "Properties of Reservoir Core Derived from 3D Images," Society of Petroleum Engineers Asia Pacific Conference on Integrated Modeling for Asset Management, Kuala Lumpur, Malaysia, SPE 87009, Mar. 2004, pp. 1-14.

Vincent, L., et al., "Watershed in digital spaces: An efficient algorithm based on immersion simulations," IEEE Transactions on Pattern Analysis and Machine Intelligence. 13(6), Jun. 1991, 583-598.

Faessel, M., et al., "Touching grain kernels separation by gap-filling," Image Anal. Stereol., 28, 2009, 195-203.

Sakellariou, A., et al., "Developing a virtual materials laboratory," Materials Today, 10(12), Dec. 2007, 44-51.

Quintal, B., et al., "Integrated numerical and laboratory rock physics applied to seismic characterization of reservoir rocks," The Leading Edge, Dec. 2011, 1360-1367.

Mavko, G., et al., The Rock Physics Handbook: Tools for Seismic Analysis of Porous Media, Cambridge University Press, 2009, pp. 260-262.

Tiab, D., et al., Petrophysics: Theory and practice of measuring reservoir rock and fluid transport properties, Gulf Professional Publishing, 2012, 239-245.

Madonna, C., et al., "Digital rock physics: numerical prediction of pressure-dependent ultrasonic velocities using micro-CT imaging," Geophys. J. Int., vol. 189, No. 3, Jun. 2012, pp. 1475-1482, XP055085256.

Walls, J., et al., "Eagle Ford shale reservoir properties from digital rock physics," First Break, European Assoc. of Geoscientists & Engineers, vol. 29, Jun. 2011, pp. 96-101, XP002696168.

International Search Report and Written Opinion for PCT/US2013/054083, Nov. 4, 2013, 14 pages.

\* cited by examiner

METHOD FOR IMPROVING THE ACCURACY OF ROCK PROPERTY VALUES DERIVED FROM DIGITAL IMAGES

This application claims the benefit under 35 U.S.C. §119 (e) of prior U.S. Provisional Patent Application No. 61/681,700, filed Aug. 10, 2012, which is incorporated in its entirety by reference herein.

BACKGROUND OF THE INVENTION

This invention relates to the field of digital imaging analysis and more specifically to digital rock physics and methods for obtaining improved values for rock properties derived from digital images.

Acquiring, developing and managing hydrocarbon reservoirs involve many decisions that are sensitive to the quality of information about the physical properties of the reservoir rock. For instance, accurate assessments of porosity, absolute permeability, relative permeability, capillary pressure, electrical resistivity, and elastic properties of rock under investigation are each of interest and value to reservoir engineers in applications including well planning, completion design, and reservoir estimates. Detailed, specific information on rock structure and properties can be useful on its own or can facilitate leveraging the greatest value out of logging and seismic data to which it provides important context. Some of the traditional techniques to acquire information about the reservoir rock have determined properties by measuring overall effect, e.g., permeability might be established with a permeameter forcing a fluid through a rock sample and recording the resulting fluid flux and pressure drops. However, such attempts to acquire information may be limited by the shape and size of the sample and are often otherwise not well suited to providing quality information in a timely manner.

Digital rock physics is an important tool for facilitating a better, quicker, and more efficient insight into rock structure and properties of interest. Such techniques produce values of important rock properties through analysis of three-dimensional (3D) images, also referred to as volumes or digital objects, representing the natural rock samples. Original grey-scale image acquisition uses scanning operations such as X-Ray computed tomography scans (CT scans) or with a focused ion beam scanning electron microscope (FIB-SEM scanning). Such techniques integrate a succession of cross-sectional scans into a whole 3D image. This original grey-scale image can be processed with segmentation techniques through subdividing the volume into discrete sub volumes, individual voxels at the most elementary level, and processing these to produce segmented volumes with each voxel allocated to either pore or a variety of solid material phases. As used herein, "solid material phases" means the mixture of grains of various minerals, cementation components, and all else that is not pore space as imaged by the scan.

A variety of segmentation methods are known to those skilled in the art of digital rock physics. These segmentation methods include, for example, those shown by Toelke, J., et al. (2010), "Computer simulations of fluid flow in sediment: From images to permeability," *The Leading Edge* (January 2010), 68-74, (hereinafter, the "Toelke (2010)" publication), and U.S. Pat. No. 8,081,802 B2 to Dvorkin et al. (hereinafter, the '802 patent).

Values for important properties can be estimated, modeled, or simulated with the resulting segmented volumes. See, e.g., Dvorkin, J., et al. (2011), "Relevance of computation rock physics," *Geophysics*, 76(5), E141-E153 (hereinafter, the "Dvorkin 2011" publication) and the '802 patent.

Circumstances are sometimes encountered, however, in which the value of one or more properties derived only from segmented volumes is unreliable. One such circumstance capable of producing unreliable property values occurs when important structure is below the resolution capabilities. These limitations may commonly be the result of the need to work with manageably sized data sets for computations and simulations and in this case derive from the scanning resolution in combination with the field-of-view required to address a representative sample. Alternatively, in some cases structural features contributing to properties of interest may be too small to accurately capture in scanned images as a limitation of the scanning equipment itself, such as sub-resolution or under-resolved features. Either way, there are instances in which an important structure is not directly captured, e.g., very thin conduits connecting the pores in some samples may not accurately resolve even at the highest magnifications practically possible. This may result in a segmented volume which does not adequately represent the actual structure of the rock.

In such cases, usual analytical techniques deriving values from such volume can yield unreliable values, e.g., an absolute permeability k for the rock that is unrealistically small or even at zero where the actual effective characteristics for that rock are quite different, e.g., production data proves otherwise. Values for elastic properties, relative permeability, capillary pressure, electrical resistivity, and other rock properties may be similarly affected. Greater accuracy for such values is important for decisions critical to determining what reservoir zones are of commercial interest and how to develop a field.

These resolution issues have become a well-recognized challenge. Dvorkin (2011) discusses the problem (e.g., E144), as does Toelke (2010) in the discussion of "unresolved pores" (p. 70) thereof, and Knackstedt, M. A., et al. (2004), "Digital core laboratory: Properties of reservoir core derived from 3D images," *SPE Asian Pacific Conference on Integrated Modeling for Asset Management.* SPE 87009, discusses the problem. It has been proposed to address such sub-resolution and/or under-resolved features by adjusting the mathematical models that are used to derive property values from the segmented volumes. See, e.g., Toelke (2010), and the published European Patent Application publication no. EP 2090907A1 for a Method for determining the properties of hydrocarbon reservoirs from geophysical data, for discussions of adjusting the mathematical models and/or changing values ascribed to phases. These adjustments are limited and can fail to produce digital volumes with structural features representative of the rock under investigation.

The use of filters with the grey-scale image and a seeding/region growing segmentation approach such as disclosed in the '802 patent can assist effective image processing by removing various anomalies and smoothing data. However, images so addressed still fail to capture connections between the pore spaces that account for properties present but which result from structure below the full resolution of the scanner.

A watershed transform had also been applied to further manipulate digital volumes. See, generally, Vincent, L., et al. (1991), "Watershed in digital spaces: An efficient algorithm based on immersion simulations," *IEEE Transactions on Pattern Analysis and Machine Intelligence.* 13(6), 583-598 (hereinafter, the "Vincent (1991)" publication) and Faessel, M., et al., (2009), "Touching grain kernels separation by gap-filling," *Image Anal Stereol.* 29. 195-203., which introduce application of the watershed transform and application to the inverse of the distance function and to gap-filling techniques. See, e.g., Sakellariou, A., et al. (2007), "Developing a virtual materials laboratory," *Materials Today*, 10(12), 44-51, which discusses using watershed to decompose an object. Quintal, B., et al. (2011), "Integrated numerical and laboratory rock physics applied to seismic characterization of reservoir rocks," *The Leading Edge*, (December 2011), 1360-1376 (hereinafter, the "Quintal (2011)" publication), relates to localizing the grain contacts below the data resolution, a "grain-contact reconstruction" method. However, the Quintal (2011) application of watershed produces unrealistic results due to "unresolved microcracks and other microstructures, which cannot be detected with the grain contact reconstruction technique" and then shows alteration of the mathematical model to compensate.

As in other prior approaches, such compensation can facilitate producing an improved value, but does not correct the structure featured in the segmented volume to best represent the rock sample.

Thus, the present investigators have recognized that there is a need for developing a method for adjusting the segmented volume to effectively amend the structure featured therein to represent the rock sample more realistically and thereby produce more reliable property values.

SUMMARY OF THE INVENTION

A feature of the present invention is a method for increasing the accuracy of a target property value derived from a sample of a porous media with digital imaging techniques.

A further feature of the present invention is a method to provide a method for revising or adjusting the representation of a segmented volume which corresponds to the sample under investigation to account for sub-resolution and/or under-resolved features, such as cracks providing connectivity between pores space which can affect fluid transport properties of the sample.

Another feature of the present invention is a segmented digital volume that can more accurately represent a sample of a porous media.

To achieve these and other advantages and in accordance with the purposes of the present invention, as embodied and broadly described herein, the present invention relates, in part, to a method for increasing the accuracy of a target property value derived from a digital image corresponding to a material sample, which comprises steps a) to e). In step a), a three-dimensional tomographic digital image of the material sample is obtained. In step b), a preliminary segmented volume is generated which corresponds to the material sample by processing the three-dimensional tomographic digital image through a segmentation process. In step c), a criterion relation which is obtained independently of the preliminary segmented volume is defined as a function of values of criterion properties related to the target property. In step d), an adjusted segmented volume is created through additional processing revising features to the preliminary segmented volume, which comprises 1) applying a processing step to identify locations for potentially revising features of the preliminary segmented volume, 2) applying revision features to the preliminary segmented volume to create a revised segmented volume; 3) deriving trial values of criteria properties from the revised segmented volume; 4) repeating at least steps 2)-3) on the revised segmented volume until trial values of criterion properties satisfy the criterion relation. In step e), a final value for the target property is derived from the adjusted segmented volume.

The present invention also relates to a method for increasing the accuracy of a target property value derived from a digital image representing a porous material sample, which comprises steps of a)-e). In step a), a three-dimensional tomographic digital image comprising a grey-scale volume of the sample is obtained. In step b), a segmented volume is obtained that represents the sample by processing the grey-scale volume to pore space and a plurality of solid material phases through a segmentation process. In step c), a criterion relationship which is developed independently of the segmented volume is obtained as a function of a pair of criterion properties related to the target property. In step d), an adjusted segmented volume is created through additional processing, which comprises 1) determining where to add a plurality of cracks to the segmented volume, which comprises: i) creating an inverse distance map of the pore space to the solid material phase boundaries in the segmented volume; ii) creating a watershed surface identifying locations for potentially introducing cracks into the solid material phases by applying a watershed processing step to the inverse distance map; and iii) selecting potential crack locations as all portions of the watershed surface located in the solid phases of the segmented volume; 2) selecting a value for degree of volume revision; 3) producing a revised segmented volume, comprising: I) selecting a portion of potential crack locations guided by degree of revision value; II) converting the voxels of the segmented volume which are located on the selected portion of potential crack locations from solid phases to pore; 4) deriving the values of criterion properties from the analysis of the revised segmented volume; 5) repeating at least the steps 3 through 4 by varying the selected degree of volume revision until the values of the criterion properties derived in step 4 satisfy the criterion relationship; and 6) selecting the revised segmented volume which produced the set of criterion properties which satisfy the criterion relationship best, as the adjusted segmented volume. In step e), the adjusted segmented volume is used to derive the target property value.

The present invention also relates to a method for increasing the accuracy of a target property value derived from a digital image representing a rock sample, which comprises steps a)-f). In step a), a grey-scale digital volume of the rock sample is obtained. In step b), a preliminary segmented volume of the rock sample is obtained by processing the grey-scale volume to a plurality of pore spaces and at least one solid material phase separated through a segmentation process. In step c), a criterion curve which is developed independently of the preliminary segmented volume is defined as a function of a pair of criterion properties related to the target property. In step d), an adjusted segmented volume is created through additional processing, which comprises 1) determining where to add a plurality of cracks to the segmented volume, which comprises i) creating an inverse distance map of the pore space to the solid material phase boundaries in the preliminary segmented volume, ii) applying a processing step identifying locations for potentially introducing cracks into the solid material phase as a function of the inverse distance map, and 2) introducing cracks to the preliminary segmented volume until the adjusted segmented volume associated with values for the pair of criterion properties that satisfies the criterion curve to produce an adjusted segmented volume. In step e), an improved segmented volume which incorporates the cracks realized in the identified adjusted segmented volume is produced and stored. In step f), the improved segmented volume is used to derive a final value for the target property.

A method for developing an adjusted absolute permeability value from a segmented volume created from tomographic image data obtained at a resolution insufficient to effectively resolve pore space connectivity directly from a rock sample under investigation, wherein the method comprises steps a)-k). In step a), a segmented volume is obtained which represents the rock sample segmented to pore spaces and solid material phase, which comprises 1) scanning the rock sample to produce a grey-scale image; and 2) segmenting the grey-scale image to produce a segmented volume composed of voxels representing pore space and voxels representing at least one solid material phase. In step b), a grey-scale value is obtained which characterizes pore space. In step c), a grey-scale value is obtained characterizing solid material. In step d), a criterion curve which is developed independently of the segmented volume is defined as a function of a select elastic property and porosity. In step e), an inverse distance map of the pore space to the solid material phase boundary is created from the segmented volume. In step f), a watershed surface is created by applying a watershed process to the inverse distance map to identify potential locations for introducing cracks. In step g), a revised segmented volume based upon a given degree of revision is produced; which comprises: 1) selecting a watershed grey-scale cut-off value, 2) finding all voxels in the grey-scale digital volume which have their grey-scale value between the grey-scale value of the pores and the watershed cut-off value, 3) finding among those voxels the voxels co-located with potential locations for introducing cracks identified by the watershed process, and 4) converting the corresponding voxels of the segmented volume to voxels representing pore space. In step h), trial values are derived for the select elastic property and porosity from an analysis of the revised segmented volume. In step i), the trial values for the select elastic property and porosity with the criterion curve are compared, and the grey-scale watershed cut-off for real-locating pore space is adjusted, and steps e)-i) are iteratively repeated until trial values satisfy the criterion curve and before proceeding to step j). In step j), an improved segmented volume which incorporates the cracks of the adjusted segmented volume is produced and stored. In step k), the improved segmented volume is used to derive the final absolute permeability value.

The present invention also relates to a method for increasing the accuracy with which a segmented volume represents a material sample having sub-resolution structure, which comprises steps a)-e). In step a), a grey-scale 3-D digital image of the sample is obtained. In step b), a preliminary segmented volume corresponding to the sample is obtained by processing the grey-scale image through a segmentation process. In step c), a criterion relation which is developed independently of the segmented volume is defined as a function of a pair of criterion properties related to a target property. In step d), an adjusted segmented volume is created through additional processing, which comprises 1) applying a processing step identifying locations for potentially revising structural features of the segmented volume, and 2) determining the degree to which revisions to structural features are to be realized in revising the segmented volume by identifying the adjusted segmented volume associated with values for the pair of criterion properties that satisfies the criterion relation. In step e), the revised structural features of the identified adjusted segmented volume are stored for use in further digital rock physics applications.

Computerized systems, computer readable media, and programs for performing the methods are also provided.

The present invention also relates to a segmented digital volume which represents a sample of a porous media, which comprises a) voxels representing pore space derived from segmentation of a 3D grey scale digital image, b) voxels representing at least one solid material phase derived from segmentation of the 3D grey scale digital image, and c) converted voxels representing structural features not fully resolved in the 3D grey scale digital image or the direct segmentation thereof. The placement of the converted voxels is derived from additional processing steps using data from the 3D grey-scale digital image and one or more segmented volumes derived therefrom, and the volume of converted voxels in place is solved to satisfy a criteria relation representative of the sample and independent of the 3D grey-scale image.

It is to be understood that both the foregoing general description and following detailed description are exemplary and explanatory only and are intended to provide a further explanation of the present invention, as claimed.

The accompanying drawings, which are incorporated in and constitute a part of the application, illustrate features of the present invention and, together with the description, serve to explain the principles of the present invention.

DETAILED DESCRIPTION OF THE PRESENT INVENTION

Figure 1:
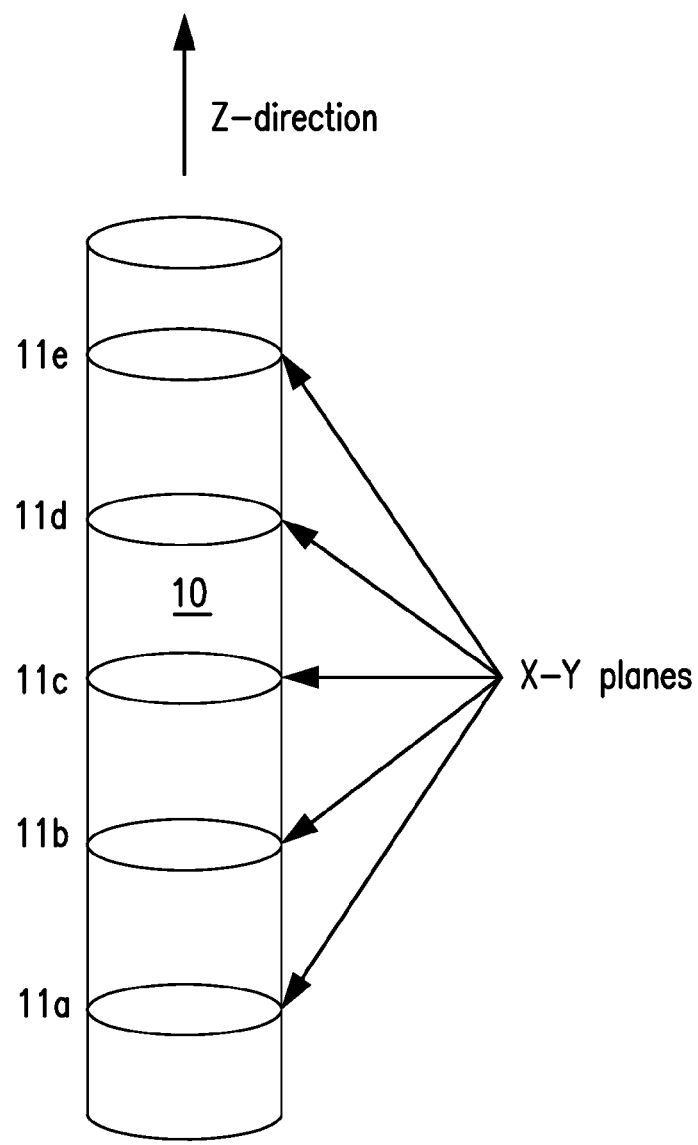
FIG. 1 is a schematic representation of a core from which a rock sample for investigation can be selected according to an example of the present application.

The present invention relates in part to a method for increasing the accuracy of a target property value derived from a sample of a porous media using digital imaging techniques. The method can be particularly well suited to investigating rock samples with techniques of digital rock physics and is hereafter illustrated in the context of such applications, but not limited thereto. For example, the target property value improved by methods of the present invention can relate to a structure that affects a fluid transport property of the sample, such as cracks providing connectivity between pores space. These cracks or other structures that can affect rock properties of interest may be difficult to accurately identify and resolve using conventional digital rock physics techniques. For example, this improved accuracy can be provided with methods of the present invention as applied to digital imaging scans of rock samples or other porous media under circumstances in which resolution available in an initial digital image may be insufficient to effectively directly capture data that accurately represents total pore space connectivity. The present invention also relates in part to providing a segmented digital volume which can more accurately represent the actual three-dimensional structure of a sample of a porous media.

The present invention also relates in part to a method for increasing the accuracy of a target property value derived from a rock sample wherein the sample is scanned to obtain a tomographic digital image, such as a grey-scale image, that can be processed to pore space and solid material phases through a segmentation process. A process is employed for revising the segmented volume, e.g., by increasing pore space connectivity, in a manner affecting the value for the target property that would be derived. The degree of revision can be conveniently expressed as function of criterion property values, such as, for example, a pair of properties which is referred to herein as a "criterion pair," and an appropriate degree of revision or adjustment to be solved can be that degree for which the derived values for the criterion properties satisfy an independently derived criterion relationship. Applying that degree of revision produces the adjusted segmented volume, which is used as an improved representation of the structure of the rock sample under investigation and can be used to derive an improved value for the target property. Another method disclosed increases the accuracy with which a segmented volume represents a material sample having structure which is not adequately resolved in an original three-dimensional tomographic digital image, such as an original grey-scale 3D digital image.

The present invention also relates to a method for revising or adjusting the representation of a segmented volume corresponding to the sample under investigation to account for sub-resolution and/or under-resolved features. This adjustment can derive from context grounding the resulting segmented volume to spatial placement to re-allocate voxels within the volume as a function of data obtained from the sample. The net effect or degree of adjustment can also calibrated or indexed based on objective criteria obtained independent of the tomographic digital image (e.g., grey-scale image) and the attendant limitations from scanning technologies and/or computing technologies.

In methods of the present invention, a three-dimensional tomographic digital image (e.g., a grey-scale digital image) of a rock sample can be obtained, for example, from scanning operations and an initial segmented volume can be produced by processing the grey-scale volume to pore space and one or more solid material phases through a segmentation process. A process for adjusting or revising the digital volume can be employed for introducing feature revisions to the segmented volume which derive spatial placement in the resulting adjusted segmented volume as a function of both the original grey-scale volume and the directly derived preliminary segmented volume. Suitable adjusting techniques which can be used can include, for example, both the watershed application to the inverse of the distance function and gap-filling techniques such as shown herein, as well as other transforms and techniques such as dilation or erosion applications.

The indicated revision of the segmented volume can be performed to address sub-resolution and/or under-resolved features in a manner affecting the value for the target property that would be derived. As indicated, the degree of revision can be conveniently expressed as function of a pair of properties, e.g., as a "criterion pair." The criterion pair can be selected for their relation to the target property, degree of revision, ease of deriving values from a segmented volume, and known inter-relation independent of the segmented volume. A criterion relation (which for convenience, can be referred to as "a criterion curve") can be expressed as a function of the pair of criterion properties, wherein the criterion relation is obtained from sources independent of the preliminary and revised segmented volumes and is compared with values for the criterion pair derived from the revised segmented volume. Instead of a criterion curve, a look-up table, database, and the like, can be used. The appropriate degree of revision or adjustment can then be solved for as that degree of revision for which the volume-derived values for the criterion properties satisfy the criterion relation or curve. Applying that degree of revision produces the adjusted segmented volume which can be used as an improved representation of the structure of the rock sample under investigation. This adjusted segmented volume can be stored on the computer and accessed to derive values for target properties such as absolute permeability. Further, those structural features can be combined with other data to produce an improved segmented volume which more realistically represents the rock sample overall. The resulting improved segmented volume can be stored in a computer from which it may be displayed or accessed for simulations, modeling, or computations including deriving improved values for additional properties. For example, the improved segmented volume can be used to derive the target property value, such as described herein.

Certain nomenclature has been adopted for the sake of consistency in this application. For example, as used herein, a "preliminary segmented volume" is the initially segmented volume unrevised and unadjusted through the practice of this invention. As used herein, "revised segmented volume" is a segmented volume prepared in the course of practicing the invention while the "adjusted segmented volume" is that revised segmented volume having revised structural features that satisfy the criterion relation. As used herein, the "improved segmented volume" has the revised structural features of the adjusted segmented volume and may also be populated with such other data as may be appropriate for application in desired simulations and deriving desired property values.

The present invention also relates to a method for increasing the accuracy with which a segmented volume represents a material sample which has structure that is not adequately resolved in an original grey-scale 3D image or other original three-dimensional tomographic digital image. By way of example, this method can be applied to develop an adjusted absolute permeability value k from data acquired in an original 3D grey-scale image with insufficient resolution to effectively image pore space connectivity. The grey-scale image can be obtained from scanning through sequential cross sections of the rock sample, grey-scale characterization values are assigned, and the integrated image can be segmented to produce an initial or preliminary segmented volume composed of voxels representing pore spaces and voxels representing one or more solid material phase(s). A preliminary value for the target property can be obtained from the preliminary segmented volume. The preliminary value can be considered in the context of the rock sample and the location of its collection. A benefit of the present invention can become evident when the preliminary value is not a reasonable match to expectations.

In methods of the present invention, a criterion curve can be developed independently of the segmented volume as a function of a select elastic property (conveniently, elastic wave velocity $V_p$) and porosity $\phi$. An inverse distance map can be created of the pore space to the solid material phase boundary from the initial or preliminary segmented volume. For each phase, a characteristic grey-scale value can be selected, which represents the grey-scale value corresponding to this phase in absence of interference caused by phase boundaries. A watershed process can be then applied to the inverse of the distance map. It produces a watershed surface in the 3-D space associated with the segmented volume. This surface can pass through the narrowest connections between solid grains in the rock sample. This particular application takes advantage of the observation that the under-resolved conduits, such as those between pore spaces, are usually located in these narrow connections, and can be visually identified in the grey-scale digital image as lines of voxels having grey-scale values between the characteristic grey-scale values for pore and solid material, thus representing potential locations in the segmented volume for introducing "cracks". A revised segmented volume can be produced based upon the degree to which these potential cracks are realized. To do this, a grey-scale watershed cut-off value can be selected for watershed application, and all voxels in the grey-scale image can be identified which have their grey-scale value between the characteristic grey-scale value for the pores and the watershed cut-off value are identified as candidate voxels. From among these, those voxels co-located with "potential cracks" delineated by watershed surfaces can be identified and the corresponding voxels of the segmented volume can be converted to voxels representing pore space. This, in effect, introduces new features to the volume as cracks providing pore space connectivity.

Trial values or calibration values for elastic property $V_p$ and porosity $\phi$ can be derived in methods of the present invention, for example, from an analysis of the revised segmented volume and these values are compared with a criterion relation which may conveniently be expressed in the plot of a criterion curve. An iterative solution, varying the grey-scale watershed cut-off value and changing the revised segmented volume accordingly, can be conveniently employed to identify the cut-off point at which the associated segmented volume produces trial values satisfying the criterion relation. The revised segmented volume associated with this solution is the adjusted segmented volume and the revised features thereof can be used in an improved segmented volume to derive the final value for the target property representative of the rock under investigation, e.g., a more realistic absolute permeability value in this example. Methods of the present invention also can be used, for example, to increase the accuracy with which a segmented volume represents a material sample having structure not adequately resolved in an original grey-scale 3D image or other original three-dimensional tomographic digital image. A segmented digital volume that can more accurately represent a sample of a porous media also can be provided by methods of the present invention. This segmented digital volume can be electronically displayed, printed on a tangible medium, or both, or can be produced or represented in other forms.

FIG. 1 is a schematic illustration of a core 10 secured from drilling operations which allow such rock samples to be cut and retrieved to the surface intact as a preferred source of rock samples for detailed investigation using digital rock physics. Studying such cores provides an enhanced opportunity to understand the specific characteristics of the rock at that location. A robust understanding of rock properties at multiple locations in the field then serves as the best foundation to better understand the reservoir and to facilitate interpreting other data such as seismic or logging data.

Although illustrated with core analysis of rock samples, it should be understood that the present invention can be applied to other materials besides natural rock. As to rock, it can be applied to percussion plugs, rotary cores, drilling cuttings, or samples of rock otherwise collected. For scanning, the type of sample preparation can depend upon the image capture method to be used. For example, samples can be cleaned, shaped, mounted, or prepared with other techniques typically used for preparing a rock sample for image capture on the type of image scanning instrument to be used. The preparation of samples, for example, can comprise cutting, abrading, shaping milling, focused ion beam polishing, other techniques to alter the size and shape of rocks, or any combinations thereof. For example, the samples have or are provided in sizes and shapes which can ensure that the object fits inside the field of view of the scanner and that it does not move during the scan. Cylinder shapes are efficient for scanning, but the sample shapes are not limited thereto.

Figure 2:
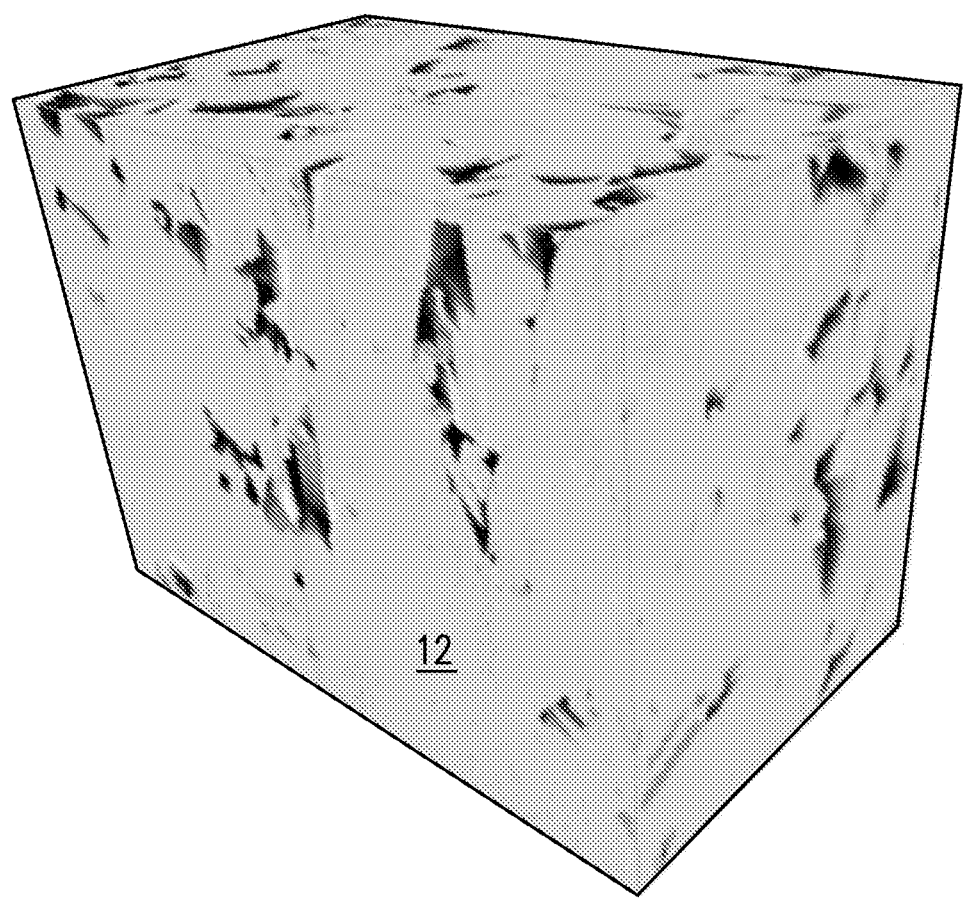
FIG. 2 is an isometric view of a 3D grey-scale digital image of the selected rock sample according to an example of the present application.
Figure 5:
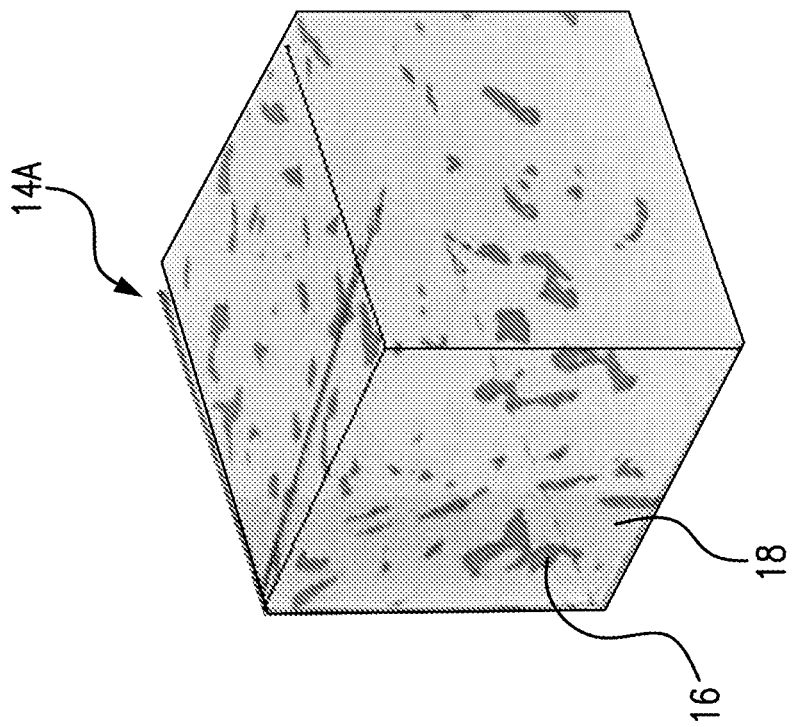
Figure 8:
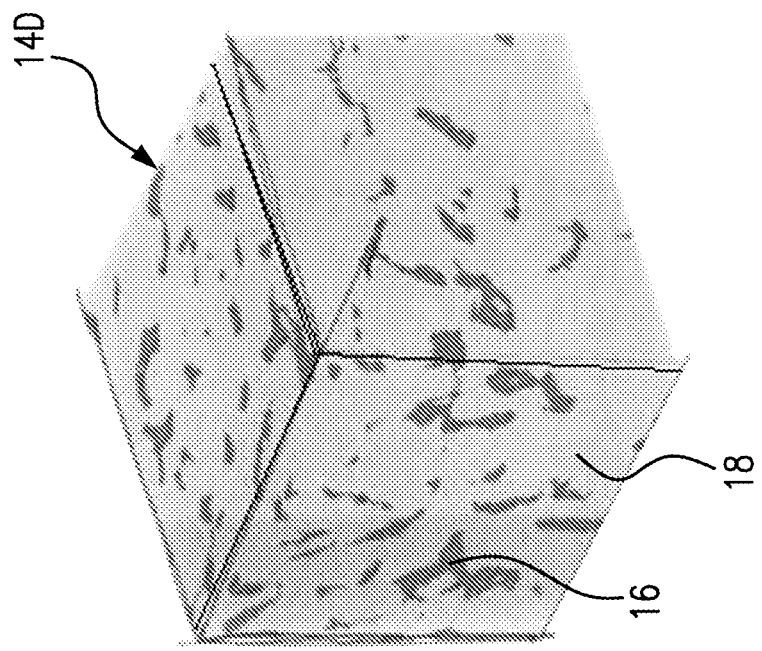
Figure 7:
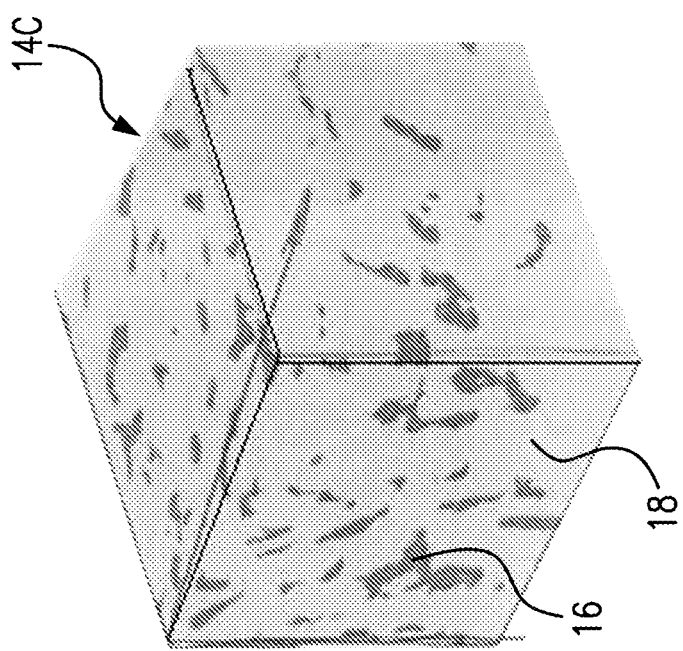

Digital rock physics is an important tool for facilitating a more accurate and rapid understanding of rock properties of interest and of value to reservoir engineers in applications including, but not limited to, well planning, completion design, reservoir management and reservoir estimates. In accordance with an illustration of practices of these techniques, natural rock samples can be scanned through sequential two-dimensional (2D) cross sections (such as schematically represented by planes 11a-11e in FIG. 1), which are used to produce tomographic digital images, such as digital grey-scale images 12, such as illustrated in FIG. 2, which have 3D visual effects, and which are referred to herein as 3D images. For example, the images 12 can visually convey 3D information on a volume of the scanned sample which can be displayed in or on a two-dimensional medium (e.g., LCD, LED-LCD, plasma display, CRT display, projection screen display, printed paper, etc.). Suitable scanning operations can employ, for example, X-Ray computed tomography scanning (CT scanning), focused ion beam scanning electron microscope (FIB-SEM scanning), magnetic resonance imaging, or other 3-D grey-scale imaging techniques generally capable of useful resolution and digitization, including magnetic resonance imaging and other applications of microtomography or microradiography technology. Typically, X-ray CT scanning is non-destructive to the scanned portions of the sample, whereas FIB-SEM is destructive to scanned portions of the sample. A rock sample can be scanned, for example, with an X-ray CT scanner, which can have a resolution down to <1 micron, or higher resolution X-ray CT scanners can be used, which can have a resolution down to 50 nanometers (nm), or other values. A FIB-SEM workstation can be used which has a resolution, for example, of from about 5 nanometers to about 30 nanometers, or other values. X-ray CT scanners and FIB-SEM workstations are commercially available which can provide these resolutions. Software typically supplied with or provided for commercial scanning machines, which can generate 2D grey-scale images for the different scanned sections of the sample. A 3D grey-scale image of a thickness portion of the sample can be obtained as a stack of the 2D grey-scale images acquired by scanning through a thickness of the sample. Further processing of 3D grey-scale images 12 such as shown in FIG. 2 through segmentation steps can produce a segmented volume 14A of elemental voxels that are characterized as either pore space 16 or solid material phase(s) 18, such as illustrated in FIG. 5.

Circumstances are sometimes encountered, however, in which the value of a given target property derived from such segmented volumes can be unreliable when the segmented volume is produced directly from the scanned data alone. For instance, very thin conduits connecting the pores in samples from some reservoir rock represented by core 10 may be difficult or impossible to image with digital rock physics using conventional arrangements. For example, very thin connecting conduits between pores in samples may be smaller than or otherwise outside the effective resolution and/or computational thresholds or limitations of the scanning equipment that is used. It can be problematic or impossible to directly and accurately resolve this structure for production of 3D images thereof, such as due to an insufficient highest available magnification on the scanning equipment that is used or as a result of computational challenges for a given magnification in combination with a required field of view. The present investigators have recognized that this can be a common situation for some shales, for example, tight carbonates or sandstones, and some igneous rock samples. In such cases, the grey-scale image 12 (FIG. 2) cannot achieve the resolution necessary for pore space connectivity to be accurately deduced through the application of the usual segmentation techniques. The segmented volume 14A of FIG. 5 represents a segmented volume produced from scanned data alone and without use of a method of the present invention. In such cases of producing segmented volumes from scanned data alone such as shown in FIG. 5, the usual analytic techniques deriving values from an unadjusted segmented volume 14A can yield unreliable results for properties such as absolute permeability, relative permeability, capillary pressure, electrical resistivity, elastic properties, and other rock properties. For instance, a Lattice-Bolzmann solution to Navier-Stockes equations (i.e., the Lattice-Bolzmann Method or "LBM") as discussed, e.g., in Toelke (2010), may yield an estimated absolute permeability for rock that is unrealistically small or even at zero This error can become known where production data may indicate a substantially greater permeability is actually present than estimated with LBM. A need that can be met by a method of the present invention is indicated in such instances where the preliminary values estimated for the target property do not match the expected values.

Figure 3:
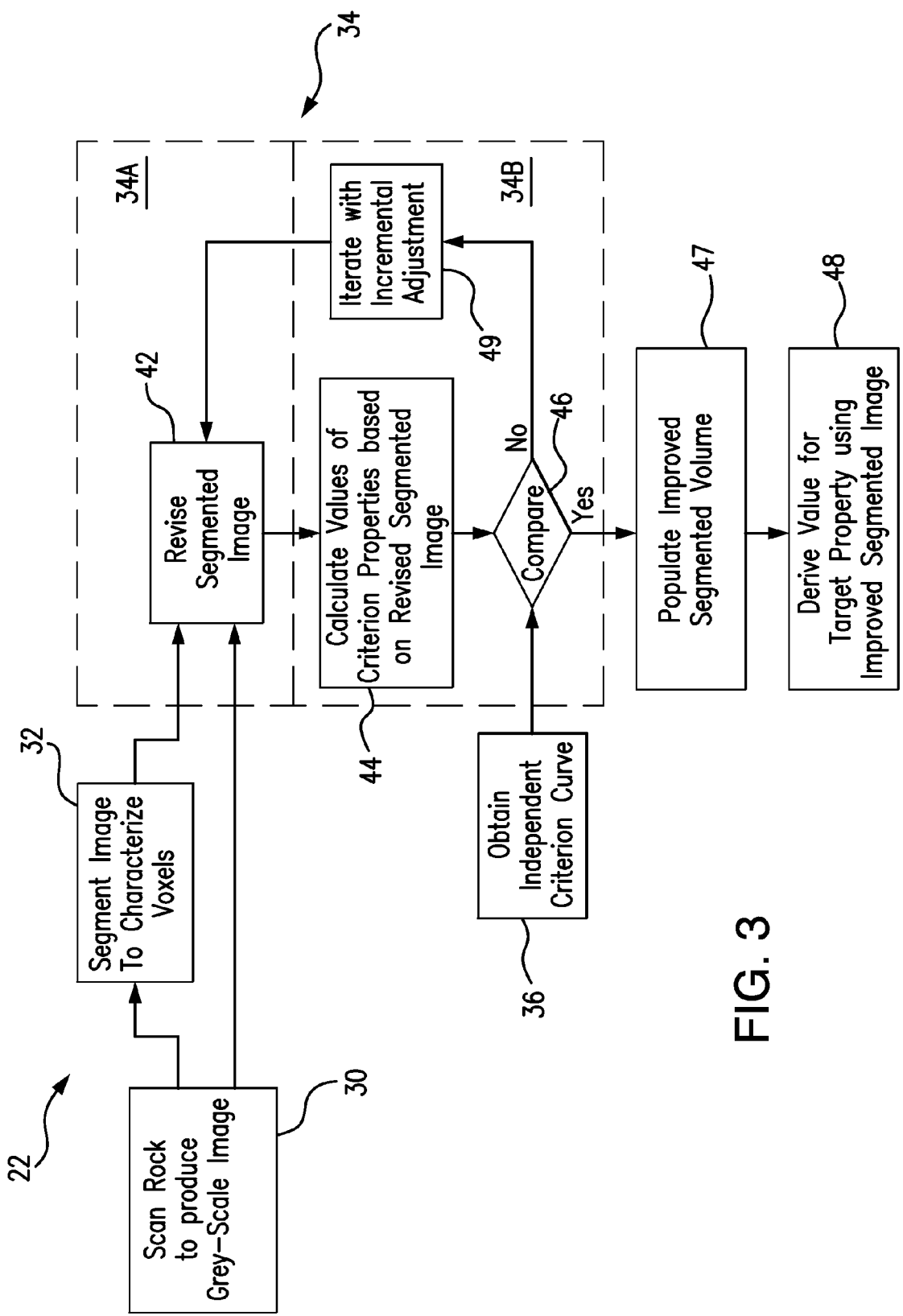
FIG. 3 is a work flow diagram according to an example of the present application.

FIG. 3 is a work flow diagram 22 illustrating a practice of the present invention for more realistically characterizing rock structure in a segmented volume of pore space and solid material phase(s) from which improved values of a target property can be obtained despite challenges to directly scanning structure in the rock sample that influence the target property values, e.g., the challenges associated with the imaging of cracks providing pores space connectivity and affecting fluid transport properties.

In step 30, a three-dimensional tomographic digital image, such as a 3D grey-scale image 12 (FIG. 2), is obtained from an integrated scan 30 of the rock sample 10 of FIG. 1. A sequence of cross sectional images is schematically illustrated as x-y planes 11a-11e. Many images can be sequentially obtained in these methods and then combined by stacking and aligning them in the proper position, to create a preliminary three-dimensional (3D) volume. The scan image output produced by a CT scanner, for example, can be a 3D numerical object including a plurality of 2D slices or sections of the imaged sample. Each 2D image can include a grid of values each corresponding to a small region of space defined within the plane of the grid. Each such small region of space can be referred to as a "pixel" and can be assigned thereto a number representing the image darkness (or for example the density of the material) determined by the CT scan procedure. The process by which the two-dimensional images are stacked and aligned is not specifically limited. The grey scale images can be stacked and aligned, for example, with commercial software application for scientific and industrial data visualization and analysis available adapted for use in the present methods. Stacking can be done, for example, by sequentially positioning the images of the slices in the order they were obtained from the sample. Alignment can rely on processing techniques which identify the correct lateral position of one slice relative to the next in the same stack.

The grey-scale image is initially segmented in step 32 in FIG. 3 and can be characterized as either pore space 16 or one or more solid material phases 18 content (see FIG. 5). The form of segmentation depends upon the type of rock and type of properties under investigation. For instance, for a target property of absolute permeability alone, it can be sufficient to segment to only two phases, one for pore space and one phase for solid material. Other properties and more complex mineralogy can be characterized with multiple solid material phases where applicable. Further, these options can be combined. As further shown herein, a multiple phase segmentation can be simplified to facilitate revising the segmented volume or for improving the value obtained for absolute permeability alone by replacing all solid material phases with the same value. This provides the same simplicity for this part of the analysis as binary segmentation, yet can preserve identification of multiple solid material phases that may be reintroduced with reassigned distinct phase values for an improved segmented volume after the structural features responsible for pore space connectivity have been adjusted. Alternatively, if features are adjusted in a binary segmentation, data may be exported to or imported from a separate compatible segmentation from the same scanned volume to populate an improved segmented volume.

For either alternative, the simplicity of working with only two characterizing values has been found to produce a good and acceptable range of usefully guided and controlled revisions. Alternatively, in situations where any limitations of computer memory, computational resources, and computation time are not at risk of being reached, revisions can be undertaken directly to produce more sophisticated segmented volumes having a greater number of uniquely characterized phases during the revision process.

For purposes herein, "segmentation" means a process of partitioning a digital image into multiple segments (sets of pixels). Image segmentation is typically used to locate objects and boundaries (lines, curves, etc.) in images. In segmentation of porous rock, for example, it can be used to allocate pore space and one or more non-porous phase regions and their boundaries. Image segmentation is the process of assigning a label to the pixels in an image such that pixels with the same label share certain visual characteristics. The result of image segmentation is a set of segments that collectively cover the entire image, or a set of contours extracted from the image. Each of the pixels in a region can be similar with respect to some characteristic or computed property, such as color, intensity, or texture. Adjacent regions are different with respect to the characteristic(s). General-purpose algorithms and techniques have been developed and used for image segmentation in the field of digital image processing. For example, a digital image of a rock sample can be segmented into its compositional classes. The term "compositional classes" can encompass, for example, open pores, mineral(s), optionally other types of materials, or any combinations thereof. Members of a single compositional class should possess the same composition and the same general structure relative to other compositional classes so that they influence to a similar extent the properties of the rock. As known in the field, there can be ambiguity in segmenting x-ray attenuation images (to use the X-ray microtomography example) into compositional classes of similar mineralogy because different rock minerals can have similar x-ray attenuations. Segmentation can be greatly aided if prior information about the mineral composition of the sample limits the number of possibilities for each pixel. As also known, where there is no prior information, x-ray diffraction (XRD) can be used to determine mineralogy. If two compositional classes have equal or nearly equal x-ray attenuations, it may be necessary to use structural metrics to distinguish them as will be understood by those skilled in the art. These and other segmentation methods and techniques may be applied or adapted for use in a method and system of the present invention.

Figure 10:
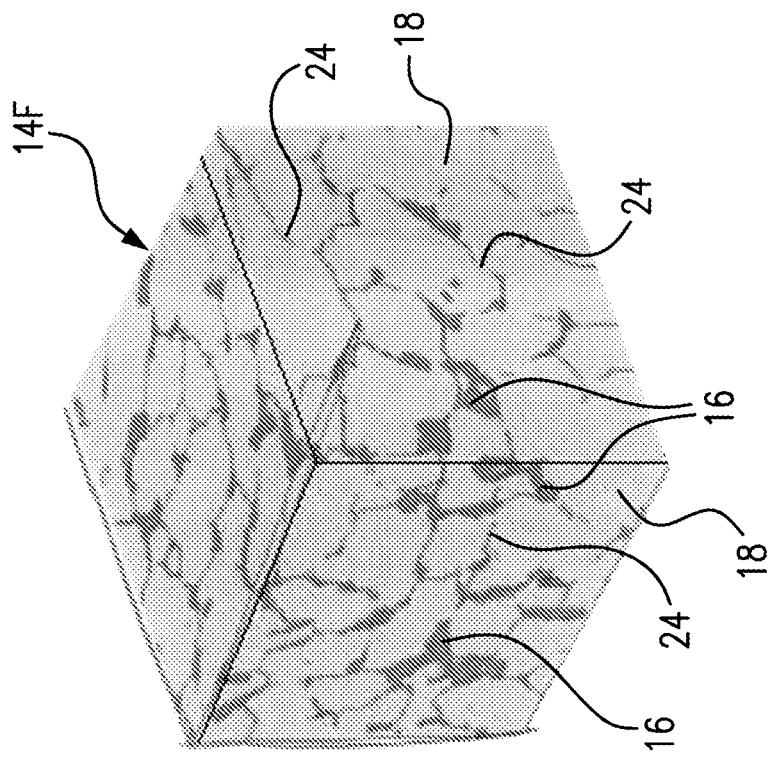

The segmented volume 14A that is produced with step 32 of FIG. 3 is illustrated in FIG. 5 for which the lack of pore space connectivity can be seen, e.g., by comparison to segmented volume 14F of FIG. 10 for which pore space connectivity is more clearly apparent in the form of numerous cracks or conduits 24. A problem arises when there is a significant and effective connectivity between the pores in the actual rock sample, but it largely resides in cracks or other conduits too small to be resolved in the grey-scale image in a meaningful manner that can be characterized through segmentation processes, such as the indicated segmentation process. In this situation, a corresponding preliminary value for a target property derived from segmented volume 14A of FIG. 5 will prove to be unreliable to the extent that property is in any way related to effective pore space connectivity. A consideration of the preliminary value demonstrating this failure to match expectations should then lead to application of the present invention.

Figure 6:
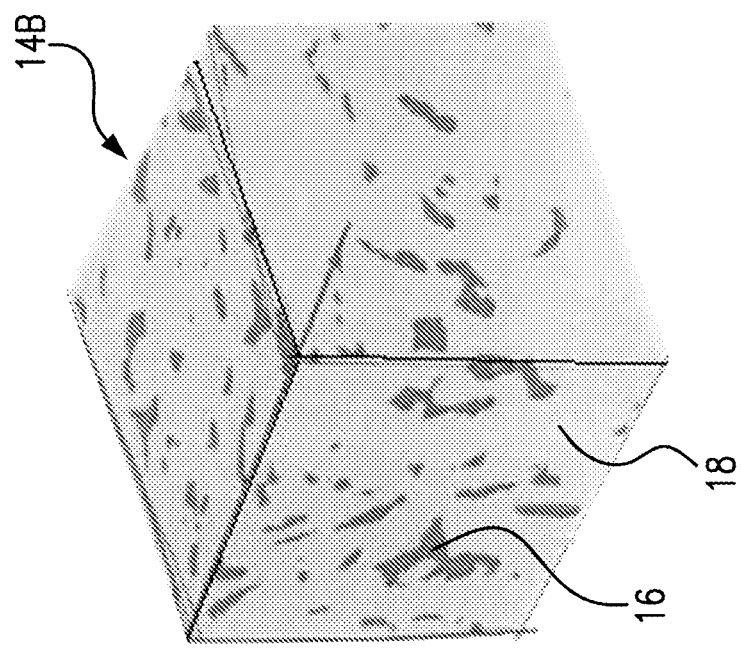
FIGS. 5-10 are a set of segmented volumes illustrating degrees of revision to levels of introduced pore space interconnectivity according to an example of the present application.
Figure 9:
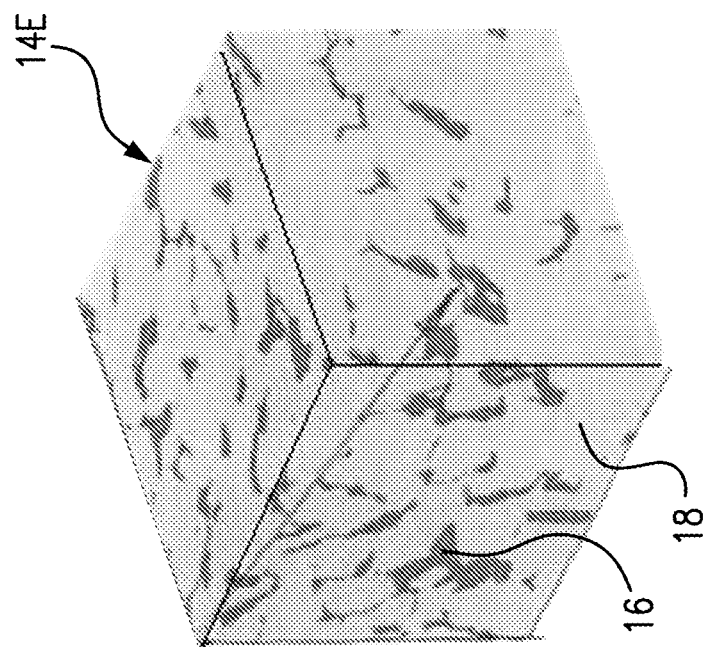
Figure 12:
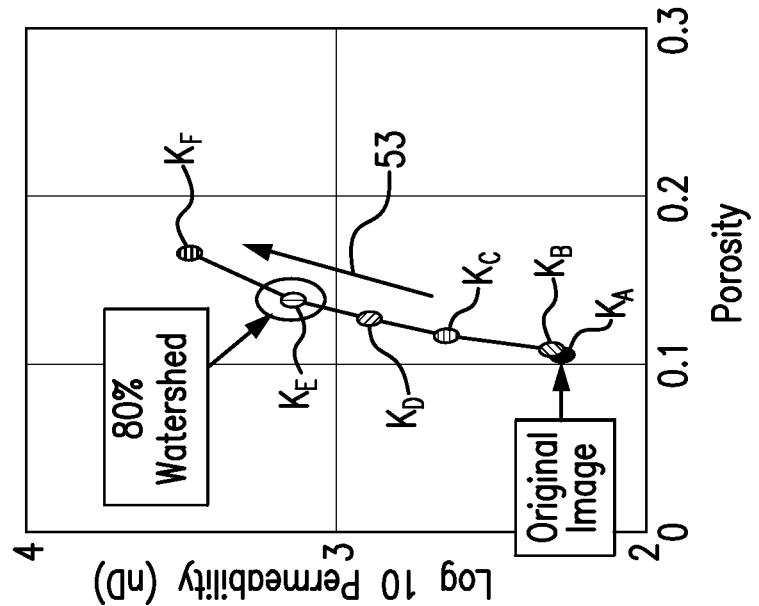
FIG. 12 is a graph illustrating a measure of the target property as a function of the degree of revision according to an example of the present application.

The present invention relates in part to a method for increasing the accuracy of a target property value by deriving the value from an adjusted segmented volume, which is illustrated herein, for example, as volume 14E in FIG. 9. In FIG. 3, a calibrating step 34 is used to produce the adjusted segmented volume using inputs from both the original grey-scale image 12 (FIG. 2) obtained from scan 30 and the directly processed segmented volume 14A (FIG. 5) segmented at step 32. These inputs provide guidance on spatial placement for where cracks or conduits 20 may be introduced to segmented volume 14B (FIG. 6) guided by resolvable structure. This guidance is generally set forth as contribution 34A to calibrating step 34, but this contribution drives toward a range of possible revisions as a function of the degree of revision, i.e., the volume of cracks that are actually introduced into a revised segmented volume produced in step 42. Here various degrees are represented by revised segmented volumes 14B-14F in FIGS. 6-10, respectively. Since each of revised segmented volumes 14B-14F will produce different target property values, it is important to identify which of these possibilities to use to derive the final target property value. For instance, consider the graph of FIG. 12 in which absolute permeability values $K_A$, $K_B$, $K_C$, $K_D$, $K_E$, and $K_F$ have been derived and plotted for each of segmented volumes 14A-14F in FIGS. 5-10, respectively. In FIG. 12, the indicated absolute permeability values are plotted as Log 10 permeability (nD) values as a function of porosity ($\phi$). Absolute permeability value $K_E$ is a value at 80% watershed.

Developing an appropriate criterion relation, illustrated here as the step of obtaining an independent criterion curve 36 in FIG. 3, provides an objective means to identify an appropriate degree of revision, i.e., to identify the appropriate revised segmented volume, here adjusted segmented volume 14E of FIG. 9, to use for further analysis. Identifying the appropriate degree of revision is generally referenced as contribution 34B of calibration step 34 in FIG. 3. Together, contribution 34A of adding the location of possible cracks or conduits with the spatial positioning guided by the original segmented volume combined with contribution 34B determining the degree that such features are realized, produces a robust calibration process 34 in support of deriving a more accurate value for the target property in step 48.

Figure 11:
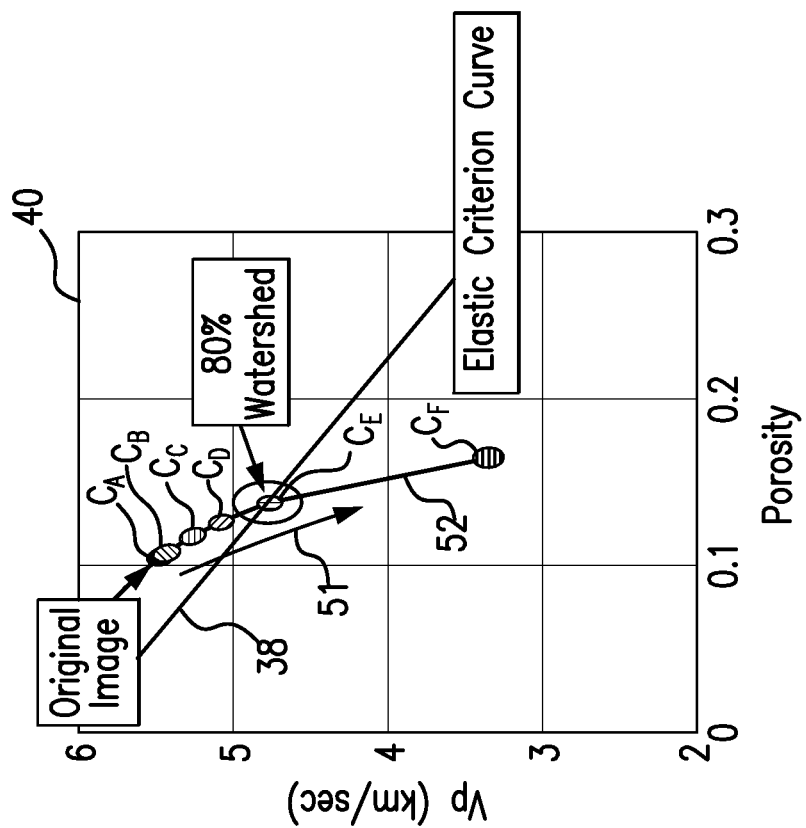
FIG. 11 is a graph illustrating an elastic criterion curve and a calibration curve defined by derived values for criterion properties associated with revisions of the segmented volume according to an example of the present application.

FIG. 11 illustrates criterion curve 38 in graph 40. This criterion curve is expressed as a relation of two criterion properties, porosity $\phi$ and elastic property $V_p$ (km/sec), in this example. The criterion properties are selected for a relationship with the target property, sensitivity to the degree of revision, and for an interrelationship to each other that can be expressed independent of the segmented volume, e.g., it can be calculated based upon a theoretical rock physics model, calculated with an empirical transform, derived from a number of historical data point relevant to the rock sample, etc.

Solving for the degree of revision in the segmented volume that satisfies the independent criterion curve identifies the adjusted segmented volume 14E for use in deriving a more accurate target value and to provide revised structure to an improved segmented volume, with reference made to step 48 in FIG. 3.

In accordance with one practice of the example in FIG. 3, the calibrating step 34 can conveniently be an iterative process wherein the grey-scale image 12 (FIG. 2) obtained in step 30 and the segmented volume 14A produced therefrom (see FIG. 5) are used to revise the segmented volume at step 42 from which calibration values are derived for criterion properties in step 44. Calibration values derived for the criterion pair from the revised segmented volume are compared with the independent criterion curve in step 46. If the derived values satisfy the criterion curve 38, that volume is the adjusted segmented volume having the revised structural features to be used. If not, iteration 49 shown in FIG. 3 is proceeded with and repeated until the appropriate adjusted segmented volume is identified.

Degrees of revision resulting in segmented volumes 14A-14F (FIGS. 5-10) produce criterion pair values $C_A$, $C_B$, $C_C$, $C_D$, $C_E$, and $C_F$, defining calibration curve 52 in FIG. 11. Criterion Pair value $C_E$ is a value at 80% watershed. As shown in FIG. 11, calibration curve 52 crosses criterion curve 38 at point $C_E$ which is associated with segmented volume 14E of FIG. 9. Adjusted segmented volume 14E with amended structural features provides a more realistic representation for pore space connectivity and can be used directly in step 48 to provide an improved absolute permeability value as a target value property. Alternatively, structural features in adjusted segmented volume 14E can provide an opportunity to derive a number of more realistic property values as a contribution to an improved segmented volume in step 47 combining with other data. For instance, these structural features can be retained or inserted in order to populate an improved segmented volume having the benefits of this structure, but without the assumptions and simplifications that had a transient purpose in facilitating the development of a better representation of sub-resolution and under-resolution structure in the rock. Thus, if a single solid material phase was assumed for this process, it can be replaced with additional data from a corresponding and compatible segmented volume with multiple solid material phases which better represent local mineralogy. Or, if multiple solid material phases were characterized with a single value for the purposes of revising structural features in the adjusted segmented volume, values can be inserted to apply distinct values among each of the individual solid material phases. For example, the additional data can constitute discrete grey-scale values which characterize a plurality of the solid material phases. This improved segmented volume is an overall better representation of the rock sample that can have a broader application than absolute permeability alone as the target property or even a group of fluid flow properties.

This improved value is herein sometimes referred to as a "final value" for the target property or properties. However, it is to be understood that the combination with other insights or analysis in the practice of this method may be possible and does not detract from the benefits afforded by the practice of this invention, as claimed, should a later step in any way further alter this "final value."

Figure 4:
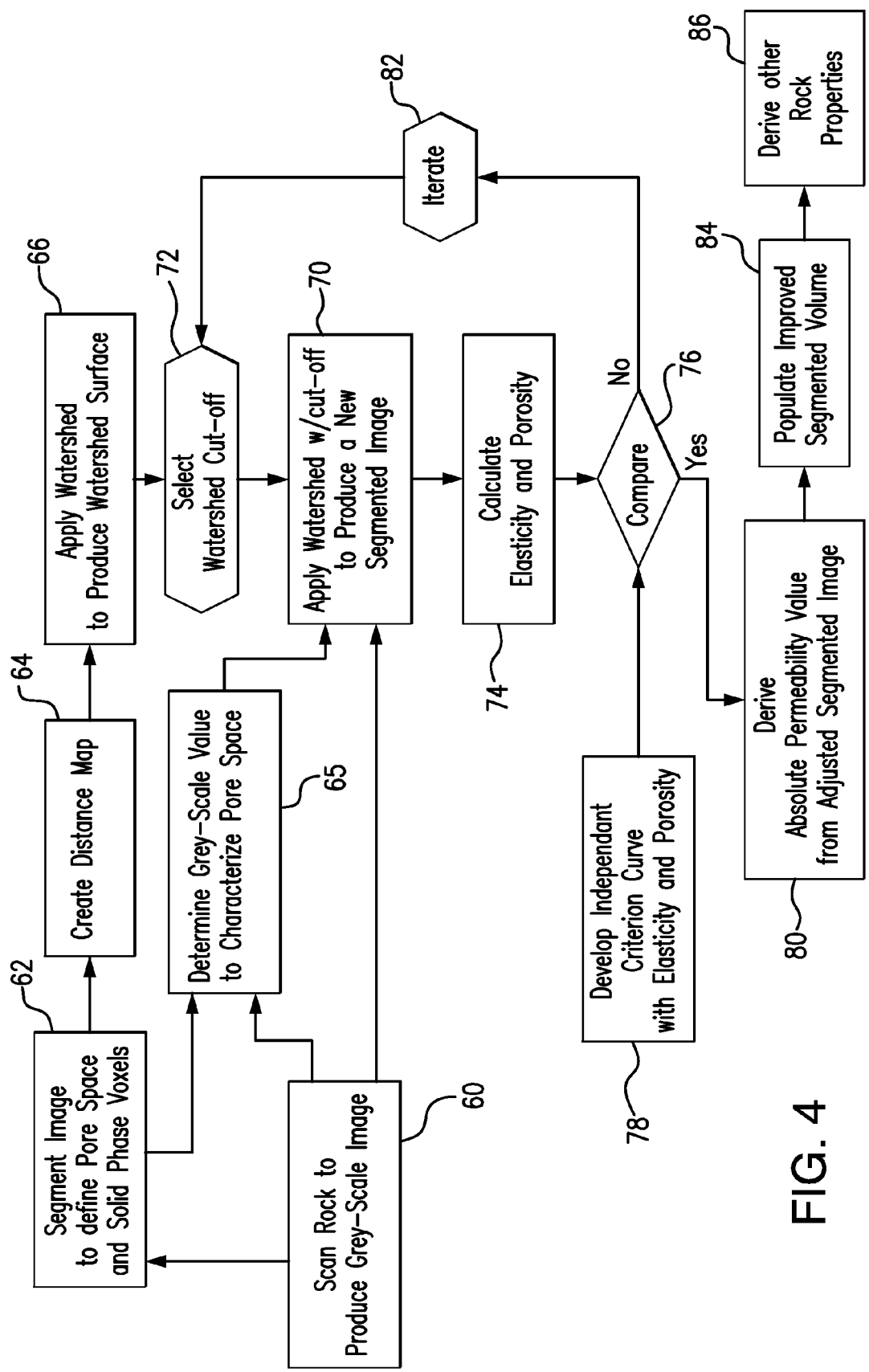
FIG. 4 is a work flow diagram of applying a watershed process in revising the segmented volume according to an example of the present application.

A particularly useful application of the present invention is addressed in the work flow diagram of FIG. 4. Scanning the rock sample 60 produces a three-dimensional tomographic digital image, such as the 3D grey-scale image (volume) 12 illustrated in FIG. 2. Returning to FIG. 4, segmenting the volume 62 converts the grey-scale image to produce segmented volume 14A of FIG. 5 having voxels initially characterized as pore space 16 and solid material phase(s) 18. Creating a distance map 64 then measures the distance from each voxel of the pore space 16 to boundaries with material 18, with reference made to FIGS. 4 and 5, respectively.

Applying a watershed process 66 to an inverse of the distance map produces a watershed surface that identifies potential locations for introducing cracks or conduits into the revised segmented volumes. Watershed techniques are generally discussed, e.g., in Vincent (1991) and other publications. The watershed algorithm (or transform) is a well-established image-processing technique for grey-scale images. It is based on a topographical interpretation of the gradient image. The density magnitude is considered as a topographical relief where the brightness value of each voxel corresponds to physical elevation. The "water flowing down" the elevation always follows the gradient direction (the direction with the maximal density change) to the nearest local minimum. Areas with common local minimum constitute watershed regions, and the borders between these regions constitute watersheds. The procedure results in partitioning of the image in catchment basins, the borders of which define the watersheds. The watershed algorithm can be used to create closed borderlines, which can be used for segmentation. Vincent (1991) shows an application of the watershed algorithm which divides the gradient field into a set of spatially connected regions, each of which is "smooth" in its interior. Thus, these regions are characterized by having strong gradients at their boundaries. Since the gradient value is proportional to the (perceptual) difference in texture, by calculating the distance metric as above, the image is segmented into regions of homogenous texture. In addition to Vincent (1991), illustrations of the watershed algorithm are provided, for example, in U.S. Pat. Nos. 6,728,314, 6,947,591, 6,956,961, 7,327,880, and 7,333,646, which are incorporated herein in their entireties by reference.

Any other processes for introducing pore space connectivity based on different algorithms may alternatively be employed, e.g., dilation-erosion. Further, pore space connectivity can be modeled with a plurality of small tubes as conduits instead of area cracks as in watershed.

In the illustrated example shown in FIG. 4, watershed application 70 combines guidance for preferred spatial placement for introducing pore space connectivity from the watershed surface of step 66, data from scanning the rock 60, and an input in the form of selecting an initial watershed cut-off value 72. All voxels having a grey-scale value between this cut-off and the grey-scale value characteristic of the pore space are identified. Of these, those voxels that are also co-located with potential locations for introducing cracks identified by the watershed surface are converted into pore space 16. Realizing these cracks or conduits 20 changes the values for many properties that can be derived from the revised segmented volume, including, but not limited to, those of porosity, elastic properties, absolute permeability, relative permeability, capillary pressure, the electrical formation factor, and other rock properties.

Common practice is to take the mode, i.e., the peak of the pore space-grey scale values histogram, of the voxels from grey-scale image 12 of FIG. 2 that corresponds to the pore space characterized in initial segmented volume 14A of FIG. 5. Other methods can be used to determine the grey-scale value characteristic of the pore space, e.g., mean value of all pore space grey-scale values, an average grey-scale value in the center of the largest pore, etc. As illustrated in FIG. 4, this has been generally designated as step 65 of determining a grey-scale value characterization of the pore space with input from the original grey-scale image from scanning the rock 60 and the original segmented volume from segmentation step 62. The output of step 65 is an input to step 70 for applying the watershed. Step 78 in FIG. 4 comprises developing an independent criterion curve 38 relating a select elastic property with porosity, such as discussed herein with respect to FIG. 11. This criterion curve can be developed, for example, from a theoretical rock physics model, recognized empirical velocity-porosity transform, or simply a number of data points relevant to the rock under examination. For example, the development of the criterion curve can comprise deriving a relationship from a number of data points relevant to the material sample, wherein the data are obtained from laboratory measurements, or data from others sources such as field-based well data, such as well logging data (e.g., wireline logging data, logging-while-drilling (LWD) data, or measurement-while-drilling (MWD)), or from more than one of these sources of data.

Dvorkin et al (2011) discusses the use of laboratory data and analysis of the "stiff sand model" (E152). The stiff sand model is further discussed in Mavko, G., et al (2009), The rock physics handbook: Tools for seismic analysis of porous media, Cambridge: University Press, (hereinafter, the "Mavko (2009)" publication), in constructing elasticity and porosity pairs (pp. 260-262). By way of another example, Mavko et al. (2009) discusses the Raymer transform (also known as the Raymer-Hunt-Gardner functional form) (p. 379). This is a mathematical formula derived from a statistical fit of extensive laboratory data and relating porosity $\phi$ and elasticity through compressional wave (P-wave) velocity $V_p$ expressed as follows:

$$V_p = (1-\phi)^2 V_{ps} + \phi V_{pf}$$

where: $V_{ps}$ is the P-wave velocity in the solid material phase; and $V_{pf}$ is the P-wave velocity in the pore fluid.

It is suitable for these purposes to simplify this on the assumption that all that is not pore space in the rock sample is solid material formed from a single, pure, solid material, e.g., a pure rock or pure mineral, such as pure quartz, for $V_{ps}$. Similarly, $V_{pf}$ may be assumed to have no significant contribution for the present purpose of characterizing the structure of the rock sample. With these simplifications, it is straightforward to develop a range of values for porosity $\phi$ in relation to elasticity represented by $V_p$. However developed, this relation can be conveniently presented as elastic criterion curve 38 in graph 40 of FIG. 11. Select elastic properties can provide particularly suitable criteria in this application because some are very sensitive to changes due to the presence of thin pores that may extend over a 2D area as "cracks" and compressional wave velocity $V_p$ is a particularly convenient track for elasticity. The compressional modulus of elasticity M would be similarly suitable for this illustrative application. Values of selected elastic property may be derived by replacing all mineral phases in an adjusted segmented volume such as described herein by one selected mineral, for which the criterion relation can be obtained. The selected mineral can be one of quartz, calcite, dolomite, or any other mineral.

Other pairs of properties may serve as the criterion pair. What is looked for is that the relationship between the criteria pair be definable both with, and independent of, the segmented volume and that the criteria pair be sensitive to the method of revision and bear a relationship with the target property. For instance, if additional processing steps were introducing single voxel "lines" of tubes or conduits rather than the 2D area "cracks" of watershed, porosity φ and the electrical resistivity formation factor FF present a more effective criterion pair. These can be solved for the criterion relationship through experimental data or for example, the Humble formula, such as discussed in Tiab, D., et al. (2012), Petrophysics: Theory and practice of measuring reservoir rock and fluid transport properties, Gulf Professional Publishing, 239-245), as a modification of Archie's equation.

Referring again to FIG. 4, applying the watershed 70 with cut-off produces a revised segmented volume 14F of FIG. 10, which is used to calculate calibration values 74 for a select elastic property and for porosity.

The porosity φ represented in revised segmented volume 14F can be simply calculated as the number of voxels characterized as pore space divided by the total number of voxels in the segmented volume.

The elastic moduli, including compressional modulus M, can be derived from the revised segmented volume using finite element analysis in a static deformation simulation. The simulation applies stresses to the faces of the revised segmented volume and the resulting strain is assumed to be a linearly elastic. Further, this is solved for dry rock assuming all that is not pore space is the same pure, solid material as assumed in developing the criterion curve, e.g., pure quartz in this example. The effective deformation from stresses applied at the boundaries is then used to calculate the compressional modulus M, from which the P-wave velocity $V_p$ is solved as:

$$V_p = \sqrt{M/\rho}$$

where: M is the compressional modulus and ρ is the bulk density.

The bulk density is readily available knowing the porosity and applying the assumption of a single material for all voxels in the solid material phase.

These volume derived values for porosity φ and a select elastic property (e.g., P-wave velocity, $V_p$) are the calibration values and are compared with the criterion curve in step 76 shown in FIG. 4. For example, graph 40 of FIG. 11 plots calibration curve 52 against criterion curve 38 as a function of porosity and elastic wave velocity.

In this example, an iterative form of solution is employed and it is convenient to overshoot the degree of adjustment in selecting the initial cut-off in step 72 shown in FIG. 4. This results in a revised segmented volume 14F as illustrated in FIG. 10 with introducing of more cracks and more pore space interconnectivity than expected in the rock. FIG. 11 illustrates bounding the solution with a low watershed cut-off point and incrementally advancing through increasing watershed cut-off points represented with the iterative loop at step 82 shown in FIG. 4. For example, an initial grey-scale watershed cut-off can be selected for reallocating pore space in the revised segmented volume which is higher than present in the rock sample. Then, the grey-scale watershed cut-off can be incrementally adjusted for reallocating pore space wherein the adjusting can proceed incrementally from low to high values of the grey-scale watershed cut-off values. In FIG. 11, arrow 51 illustrates the trend line of changes to the criterion pair and greater degrees of revision. These iterations produce revised segmented volumes 14B, 14C, 14D and 14E (FIGS. 6-9) associated with derived criterion pairs $C_B$, $C_C$, $C_D$ and $C_E$, respectively, each plotted in FIG. 11 and defining calibration curve 52 illustrating this relationship.

Once the calibration values derived from the revised segmented volume satisfy the criterion curve, as at point $C_E$ on FIG. 11, that revised segmented volume, here volume 14E of FIG. 9, becomes the adjusted segmented volume and is used to derive the absolute permeability value for the target property in step 80 shown in FIG. 4.

If the target value is absolute permeability, an improved and more accurate value can be obtained, for example, from the adjusted segmented volume using the LBM to solve Navier-Stokes equations as discussed above to derive the final value.

Since this adjustment addresses pore space connectivity, the values for other target properties for which pore space connectivity is important, e.g., other fluid flow properties, may be similarly improved. For instance, other properties for which target values may be improved through this technique, include, but are not limited to, relative permeability $k_{rel}$ capillary pressure $P_c$, and electrical resistivity formation factor FF, see, e.g., Dvorkin (2011). And, in the course of using a criterion pair of elastic property $V_p$ and porosity Φ, more realistic values were already identified with the adjusted segmented image. However, as discussed above, it can be advantageous to first populate the adjusted segmented volume with additional data in an improved segmented volume as groundwork (see optional step 84 in FIG. 4) for application in deriving additional values beyond absolute permeability (see step 86 in FIG. 4).

Further, the depositional formation of the rock samples are known to produce some properties having an anisotropic nature and it can be desirable to derive improved values for such target properties for each direction in the adjusted or improved segmented volumes.

Figure 13:
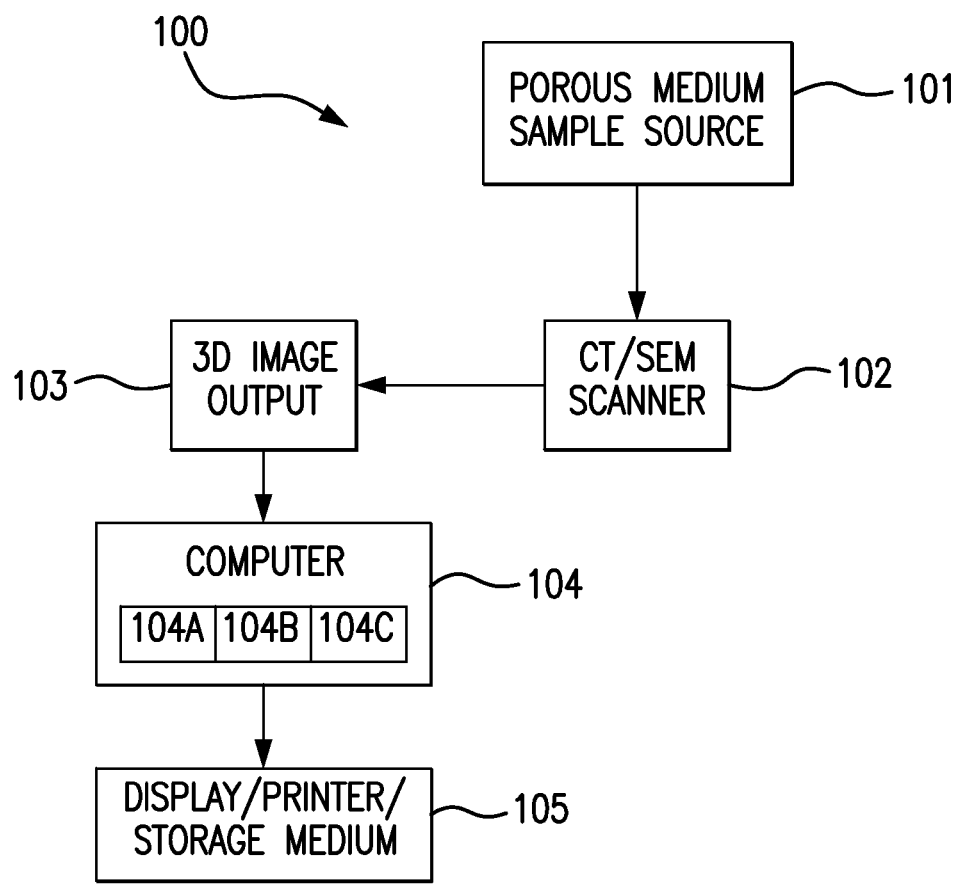
FIG. 13 shows a system according to an example of the present invention.

Referring to FIG. 13, a system (100) is shown which can be adapted for performing the present methods. As shown in this example, three dimensional (3D) images of the porous medium samples obtained from source (101) are generated by the scanner (102). The scanner can comprise, for example, a computer tomographic (CT) scanner, a scanning electron microscope (SEM), a focused ion beam scanning electron microscope (FIB-SEM), or similar device capable of producing a three dimensional digital image of a porous medium. The 3D image output (103) of the scanner can be transferred to a computer (104) having program instructions for carrying out the 3D image analysis, and the indicated criterion and watershed simulation analyses, to generate sample modeling output/results which can transmitted to one or more devices (105), such as a display, a printer, data storage medium, or combinations of these. The computer programs used for 3D image analysis and the CFD computations and simulation modeling can be stored, as a program product, on at least one computer usable storage medium (104B) (e.g. a hard disk, a flash memory device, a compact disc, a magnetic tape/disk, or other media) associated with at least one processor (104A) (e.g., a CPU or GPU) which is adapted to run the programs, or may be stored on an external computer usable storage medium (not shown) which is accessible to the computer processor. Computer (104) can include at least one non-transitory readable memory unit (104C) for storage of the programs, input data and output data, and other program results, or combinations of these. For output display, device (105) can be, for example, a display monitor, CRT, or other visual means of display (not shown). The computer (104) may include one or more system computers, which may be implemented as a single personal computer or as a network of computers. However, those skilled in the art will appreciate that implementations of various techniques described herein may be practiced in a variety of computer system configurations, including hypertext transfer protocol (HTTP) servers, hand-held devices, multiprocessor systems, microprocessor-based or programmable consumer electronics, network PCs, minicomputers, mainframe computers, and the like. The units of system (100) including scanner (102), computer (104), and output display and/or external data storage (105), can be connected to each other for communications (e.g., data transfer, etc.), via any of hardwire, radio frequency communications, telecommunications, internet connection, or other communication means. It is to be understood that the methods described herein may be implemented in various forms of hardware, software, firmware, special purpose processors, or any combination thereof.

The present invention includes the following aspects/embodiments/features in any order and/or in any combination:

1. A method for increasing the accuracy of a target property value derived from a digital image representing a material sample, comprising:
    a) obtaining a three-dimensional tomographic digital image of the material sample;
    b) generating a preliminary segmented volume corresponding to the material sample by processing the three-dimensional tomographic digital image through a segmentation process;
    c) obtaining a criterion relation developed independently of the preliminary segmented volume as a function of values of criterion properties related to the target property;
    d) creating an adjusted segmented volume through additional revising features to the preliminary segmented volume, comprising:
        1) applying a processing step to identify locations for potentially revising features of the preliminary segmented volume;
        2) applying revision features to the preliminary segmented volume to create a revised segmented volume;
        3) deriving trial values of criteria properties from the revised segmented volume;
        4) repeating at least steps 2)-3) on the revised segmented volume until trial values of criterion properties satisfy the criterion relation; and
    e) deriving a final value for the target property from the adjusted segmented volume.
2. The method of any preceding or following embodiment/feature/aspect, wherein the values of criterion properties are values of a pair of criterion properties.
3. The method of any preceding or following embodiment/feature/aspect, wherein obtaining a three-dimensional tomographic digital image of the material sample comprises scanning the material sample with at least one of a group comprising: focused ion beam scanning electron microscope, X-ray computed tomography, and magnetic resonance imaging.
4. The method of any preceding or following embodiment/feature/aspect, wherein the obtaining of the preliminary segmented volume corresponding to the material sample comprises processing the three-dimensional tomographic digital image to a plurality of phases for producing the preliminary segmented volume as comprised of voxels characterized as either pore space or solid material phase.
5. The method of any preceding or following embodiment/feature/aspect, wherein:
    a) the revising of features comprises adding cracks;
    b) the applying of a processing step to identify locations for potentially revising features of the preliminary segmented volume further comprises:
        1) creating an inverse distance map of the pore space to the solid material phase boundaries in the preliminary segmented volume; and
        2) applying a watershed processing step for identifying positions for potentially introducing cracks into the solid material phase as a function of the inverse distance map; and
    c) the obtaining of a criterion relation developed independently of the preliminary segmented volume as a function of a pair of criterion properties related to the target property further comprises defining the criterion relationship using one or more of a group comprising: calculating a theoretical criterion relationship based on a theoretical material physics model, employing an empirical transform, and deriving a relationship from a number of data points relevant to the material sample;
    d) the creating of an adjusted segmented volume through additional revising features to the preliminary segmented volume by revising the adjusted segmented volume until the associated values for the pair of criterion properties satisfies the criterion relation, and further comprises:
        (1) obtaining a characteristic grey-scale value of the pore space
        (2) applying an iterative watershed cut-off value; comprising:
            i) selecting a watershed grey-scale cut-off value;
            ii) finding all candidate voxels in the three-dimensional tomographic digital image which have their grey-scale value between the characteristic grey-scale value of the pore space and the iterative watershed cut-off value;
            iii) finding among those candidate voxels the voxels to be realized which are co-located with potential locations for introducing cracks identified in the watershed surface; and
            iv) converting the voxels identified to be realized in the segmented volume to voxels representing pore space;
            v) deriving trial values for criterion properties from an analysis of the revised segmented volume; and
            vi) comparing the trial values for the criterion properties with the criterion relationship, adjusting the grey-scale watershed cut-off for reallocating pore space and iteratively repeating steps ii) to vi) until the trial values satisfy the criterion relationship.
6. The method of any preceding or following embodiment/feature/aspect, wherein:
    a) the material sample comprises a rock sample;
    b) the pair of criterion properties comprise porosity and a select elastic property; and
    c) the target property is selected from a group comprising: absolute permeability, relative permeability, capillary pressure, and electrical resistivity.
7. The method of any preceding or following embodiment/feature/aspect, further comprising populating the adjusted segmented volume with additional properties, and using a resulting segmented volume to derive additional properties of interest from the adjusted segmented volume.
8. The method of any preceding or following embodiment/feature/aspect, wherein step 4) comprises repeating steps 1)-3) on the revised segmented volume until trial values of criterion properties satisfy the criterion relation.
9. The method of any preceding or following embodiment/feature/aspect, further comprising storing the adjusted segmented volume created in step d).

10. A method for increasing the accuracy of a target property value derived from a digital image representing a porous material sample, comprising:
   a) obtaining a three-dimensional tomographic digital image comprising a grey-scale volume of the sample;
   b) obtaining a segmented volume representing the sample by processing the grey-scale volume to pore space and a plurality of solid material phases through a segmentation process;
   c) obtaining a criterion relationship developed independently of the segmented volume as a function of a pair of criterion properties related to the target property;
   d) creating an adjusted segmented volume through additional processing, comprising:
      1) determining where to add a plurality of cracks to the segmented volume, comprising:
         i) creating an inverse distance map of the pore space to the solid material phase boundaries in the segmented volume;
         ii) creating a watershed surface identifying locations for potentially introducing cracks into the solid material phases by applying a watershed processing step to said inverse distance map;
         iii) selecting potential crack locations as all portions of the watershed surface located in the solid phases of the segmented volume;
      2) selecting a value for degree of volume revision;
      3) producing a revised segmented volume, comprising:
         I) selecting a portion of potential crack locations guided by degree of revision value;
         II) converting the voxels of the segmented volume which are located on said selected portion of potential crack locations from solid phases to pore;
      4) deriving the values of criterion properties from the analysis of the revised segmented volume;
      5) repeating at least the steps 3 through 4 (or steps 2 through 4) by varying the selected degree of volume revision until the values of said criterion properties derived in step 4 satisfy the criterion relationship;
      6) selecting the revised segmented volume which produced the set of criterion properties which satisfy the criterion relationship best, as the adjusted segmented volume; and
   e) using the adjusted segmented volume to derive the target property value.

11. The method of any preceding or following embodiment/feature/aspect, wherein obtaining the three-dimensional tomographic digital image of the sample comprises using at least one of a group comprising: a focused ion beam scanning electron microscope, X-ray computed tomography, and magnetic resonance imaging.

12. The method of any preceding or following embodiment/feature/aspect, wherein the target property value comprises a value selected from a group of properties comprising: absolute permeability, relative permeability, capillary pressure, electrical resistivity and select elastic properties; and wherein the porous material sample is a rock sample.

13. The method of any preceding or following embodiment/feature/aspect, wherein:
   a) the target property comprises a value selected from a group comprising: absolute permeability, relative permeability, capillary pressure, and electrical resistivity; and
   b) the pair of criterion properties are a select elastic property and porosity.

14. The method of any preceding or following embodiment/feature/aspect, wherein the select elastic property is an elastic wave velocity $V_P$.

15. The method of any preceding or following embodiment/feature/aspect, wherein obtaining the criterion relationship independent of the digital volume comprises one or more of a group comprising: calculating a theoretical criterion relationship based on a theoretical rock physics model, employing an empirical velocity-porosity transform, and deriving a relationship from a number of data points relevant to the rock sample.

16. The method of any preceding or following embodiment/feature/aspect, wherein deriving the values of selected elastic property utilizes replacing all mineral phases in adjusted segmented volume by one selected mineral, for which the criterion relation can be obtained.

17. The method of any preceding or following embodiment/feature/aspect, wherein the selected mineral is one of quartz, calcite, or dolomite.

18. The method of any preceding or following embodiment/feature/aspect, further comprising:
   a) obtaining, after step c) and before step d), characteristic grey-scale value of the voxels of the grey-scale volume located in the pore space of the said segmented volume; and
   b) wherein (1) the selecting of a degree of volume revision comprises selecting a grey-scale value larger than said characteristic grey-scale value of the pore space; and (2) the selecting of a portion of potential crack locations guided by degree of revision value comprises selecting those voxels of potential crack locations, whose grey-scale value in the grey-scale volume is smaller than the degree of volume revision 19. The method of any preceding or following embodiment/feature/aspect, wherein:
   a) the sample of a porous media comprises a rock sample; and
   b) the target property is selected from a group comprising: absolute permeability, relative permeability, capillary pressure, and electrical resistivity.

20. A method for increasing the accuracy of a target property value derived from a digital image representing a rock sample, comprising:
   a) obtaining a grey-scale digital volume of the rock sample;
   b) obtaining a preliminary segmented volume of the rock sample by processing the grey-scale volume to a plurality of pore spaces and at least one solid material phase separated through a segmentation process;
   c) defining a criterion curve developed independently of the preliminary segmented volume as a function of a pair of criterion properties related to the target property;
   d) creating an adjusted segmented volume through additional processing, comprising:
      1) determining where to add a plurality of cracks to the preliminary segmented volume, comprising:
         i) creating an inverse distance map of the pore space to the solid material phase boundaries in the preliminary segmented volume;
         ii) applying a processing step identifying locations for potentially introducing cracks into the solid material phase as a function of the inverse distance map;
      2) introducing cracks to the preliminary segmented volume until the adjusted segmented volume associated with values for the pair of criterion properties that satisfies the criterion curve to produce an adjusted segmented volume;
   e) producing and storing an improved segmented volume incorporating the cracks realized in the identified adjusted segmented volume; and
   f) using the improved segmented volume to derive a final value for the target property.

21. The method of any preceding or following embodiment/feature/aspect, wherein absolute permeability is the target property and wherein the identified adjusted segmented volume is the improved segmented volume.
22. The method of any preceding or following embodiment/feature/aspect, wherein the target property is related to pore space connectivity and obtaining a grey-scale image of the rock sample comprises scanning the rock sample under circumstances in which resolution available in an initial digital image is insufficient to effectively directly capture data accurately representing total pore space connectivity.
23. The method of any preceding or following embodiment/feature/aspect, wherein determining the degree to which cracks are to be realized further comprises:
  a) selecting an initial grey-scale watershed cut-off for reallocating pore space in the revised segmented volume higher than present in the rock sample,
  b) incrementally adjusting the grey-scale watershed cut-off for reallocating pore space wherein the adjusting proceeds incrementally from low to high.
24. The method of any preceding or following embodiment/feature/aspect, further comprising deriving a preliminary value from the preliminary segmented volume and comparing the preliminary target value with expectations developed independent of the preliminary segmented volume.
25. A method for developing an adjusted absolute permeability value from a segmented volume created from tomographic image data obtained at a resolution insufficient to effectively resolve pore space connectivity directly from a rock sample under investigation, said method comprising:
  a) obtaining a segmented volume representing the rock sample segmented to pore spaces and solid material phase, comprising:
    1) scanning the rock sample to produce a grey-scale image; and
    2) segmenting the grey-scale image to produce a segmented volume composed of voxels representing pore space and voxels representing at least one solid material phase;
  b) obtaining a grey-scale value characterizing pore space;
  c) obtaining a grey-scale value characterizing solid material;
  d) defining a criterion curve developed independently of the segmented volume as a function of a select elastic property and porosity;
  e) creating an inverse distance map of the pore space to the solid material phase boundary from the segmented volume;
  f) creating a watershed surface by applying a watershed process to the inverse distance map to identify potential locations for introducing cracks;
  g) producing a revised segmented volume based upon a given degree of revision; comprising:
    1) selecting a watershed grey-scale cut-off value;
    2) finding all voxels in the grey-scale digital volume which have their grey-scale value between the grey-scale value of the pores and the watershed cut-off value;
    3) finding among those voxels the voxels co-located with potential locations for introducing cracks identified by the watershed process; and
    4) converting the corresponding voxels of the segmented volume to voxels representing pore space;
  h) deriving trial values for the select elastic property and porosity from an analysis of the revised segmented volume;
  i) comparing the trial values for the select elastic property and porosity with the criterion curve, adjusting the grey-scale watershed cut-off for reallocating pore space and iteratively repeating steps e)-i) until trial values satisfy the criterion curve and before proceeding to step j;
  j) producing, and optionally storing for use in further digital rock physics applications, an improved segmented volume incorporating the cracks of the adjusted segmented volume; and
  k) using the improved segmented volume to derive the final absolute permeability value.
26. The method of any preceding or following embodiment/feature/aspect, wherein obtaining the grey-scale image of the rock sample comprises using one or more from a group comprising: focused ion beam scanning electron microscope, X-ray computed tomography, and magnetic resonance imaging.
27. The method of any preceding or following embodiment/feature/aspect, wherein defining the criterion curve independent of the digital volume comprises one or more from a group comprising: calculating a theoretical criterion curve based on a theoretical rock physics model, employing an empirical velocity-porosity transform, and deriving a curve from a number of data points relevant to the rock sample.
28. The method of any preceding or following embodiment/feature/aspect, wherein defining the criterion curve independent of the segmented volume further comprises an analysis based on an assumption that all that is not pore is a single pure mineral and wherein the step of deriving trial values from the digital volume applies the same assumption and mineral.
29. The method of any preceding or following embodiment/feature/aspect, wherein selecting an initial grey-scale watershed cut-off for reallocating pore space comprises selecting a grey-scale watershed cut-off for producing pore space in the revised segmented volume higher than grey-scale value characterizing the pore space, and wherein incrementally adjusting the grey-scale watershed cut-off thereafter for reallocating pore space comprises bracketing with a low value and incrementally increasing the grey-scale watershed cut-off.
30. The method of any preceding or following embodiment/feature/aspect, wherein using the segmented volume associated with the trial values satisfying the criterion curves to derive the adjusted absolute permeability value further comprises deriving the final absolute permeability values in all three directions of the segmented volume.
31. A method for increasing the accuracy with which a segmented volume represents a material sample having sub-resolution structure, comprising:
  a) obtaining a grey-scale 3-D digital image of the sample;
  b) obtaining a preliminary segmented volume corresponding to the sample by processing the grey-scale image through a segmentation process;
  c) defining a criterion relation developed independently of the segmented volume as a function of a pair of criterion properties related to a target property;
  d) creating an adjusted segmented volume through additional processing, comprising:
    1) applying a processing step identifying locations for potentially revising structural features of the segmented volume; and
    2) determining the degree to which revisions to structural features are to be realized in revising the segmented volume by identifying the adjusted segmented volume associated with values for the pair of criterion properties that satisfies the criterion relation; and e) storing the revised structural features of the identified adjusted segmented volume for use in further digital rock physics applications.

32. The method of any preceding or following embodiment/feature/aspect, wherein obtaining a grey-scale image of the sample comprises scanning the sample with at least one of the following: focused ion beam scanning electron microscope, X-ray computed tomography, and magnetic resonance imaging.

33. The method of any preceding or following embodiment/feature/aspect, wherein obtaining a segmented volume corresponding to the sample by processing the grey-scale image to a plurality of phases comprises producing the segmented volume composed of voxels characterized as either pore space or solid material phase.

34. The method of any preceding or following embodiment/feature/aspect, wherein the material sample is rock and wherein:
    a) revising features comprises adding cracks;
    b) applying a watershed processing step identifying locations for potentially revising features of the segmented volume further comprises:
        1) creating an inverse distance map of the pore space to the solid material phase boundaries in the segmented volume; and
        2) applying a processing step for identifying positions for potentially introducing cracks into the solid material phase as a function of the inverse distance map; and
    c) defining a criterion relation developed independently of the segmented volume as a function of a pair of criterion properties related to the target property further comprises:
        1) expressing the criterion relation as a criterion curve; and
        2) defining the criterion curve, comprises using one or more of a group comprising: calculating a theoretical criterion curve based on a theoretical rock physics model, employing an empirical transform, or deriving a relationship from a number of data points relevant to the rock sample;
    d) determining the degree to which features are to be realized in revising the segmented volume by identifying an adjusted segmented volume associated with values for the pair of criterion properties that satisfies the criterion relation further comprises:
        1) obtaining characteristic grey-scale value of the pore space
        2) applying an iterative watershed cut-off value; comprising:
            i) finding all voxels in the grey-scale image which have their grey-scale value between the characteristic grey-scale value of the pores and the iterative watershed cut-off value;
            ii) finding among those voxels the voxels co-located with potential locations for introducing cracks identified in the watershed surface;
            iii) converting the corresponding voxels of the segmented volume to voxels representing pore space;
            iv) deriving trial values for the select elastic property and porosity from an analysis of the revised segmented volume; and
            v) comparing the trial values for the select elastic property and porosity with the criterion curve, adjusting the grey-scale watershed cut-off for reallocating pore space and iteratively repeating steps d)(2)i)-d)(2)v) until the trial values satisfy the criterion curve.

35. The method of any preceding or following embodiment/feature/aspect, wherein the pair of criterion properties comprise porosity and a select elastic property.

36. The method of any preceding or following embodiment/feature/aspect, further comprising using the revised structural features of the identified adjusted segmented volume to derive a value for the target property which is selected from a group of properties comprising: absolute permeability, relative permeability, capillary pressure, and electrical resistivity.

37. The method of any preceding or following embodiment/feature/aspect, further comprising using the revised structural features of the identified adjusted segmented volume to derive a value for at least one other the fluid flow property.

38. The method of any preceding or following embodiment/feature/aspect, further comprising combining the revised structural features of the identified adjusted segmented image with data from at least one other segmented image.

39. The method of any preceding or following embodiment/feature/aspect, wherein at least one of the other segmented images with which the revised structural features are combined has a plurality of solid material phases.

40. A system for increasing the accuracy of a target property value derived from a digital image corresponding to a material sample, comprising:
    a) an X-ray scanner operable to scan a rock sample to obtain a three-dimensional tomographic digital image, such as a 2D grey-scale image, of the rock sample; and
    b) one or more computer systems operable to i) obtain a three-dimensional tomographic digital image, such as a grey-scale 3-D digital image, of the material sample; ii) obtain a preliminary segmented volume corresponding to the material sample by processing the grey-scale 3D digital image through a segmentation process; iii) create a criterion relation developed independently of the preliminary segmented volume as a function of criterion property values related to the target property; iv) create an adjusted segmented volume through additional revising features to the preliminary segmented volume, comprising: 1) apply a processing step to identify locations for potentially revising features of the preliminary segmented volume; 2) apply revision features to the preliminary segmented volume to create a revised segmented volume; 3) derive trial values of criteria properties from the revised segmented volume; 4) repeat at least steps 2)-3) on the revised segmented volume until trial values of criterion properties satisfy the criterion relation; v) store an adjusted segmented volume incorporating the revised features of the adjusted segmented volume identified; vi) derive a final value for the target property from the adjusted segmented volume; and vii) output the results to at least one device to display, print, or store results of the computations; and
    c) at least one device to display, print, or store results of the computations.

41. A computer program product on a non-transitory computer readable medium that, when performed on a processor in a computerized device provides a method for performing computations of one or more or all of the indicated steps of the method of any preceding claim.

42. A segmented digital volume representing a sample of a porous media comprising:
    a) voxels representing pore space derived from segmentation of a 3D grey scale digital image;
    b) voxels representing at least one solid material phase derived from segmentation of the 3D grey scale digital image; and
    c) converted voxels representing structural features not fully resolved in the 3D grey scale digital image or the direct segmentation thereof wherein:

the placement of the converted voxels is derived from additional processing steps using data from the 3D grey-scale digital image and one or more segmented volumes derived therefrom; and the volume of converted voxels in place is solved to satisfy a criteria relation representative of the sample and independent of the 3D grey-scale image.

43. A segmented digital volume of any preceding or following embodiment/feature/aspect, wherein:

the structural features are cracks unresolved in the 3D grey-scale image and contributing pore space connectivity present in the porous media not accounted for in a preliminary segmentation of the 3D grey-scale image; and the converted voxels represent additional pore space.

44. A segmented digital volume of any preceding or following embodiment/feature/aspect, wherein:

the structural features are conduits unresolved in the 3D grey-scale image and contributing pore space connectivity present in the porous media not accounted for in a preliminary segmentation of the 3D grey-scale image; and the converted voxels represent additional pore space.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for increasing the accuracy of a target property value derived from a digital image representing a material sample, comprising:
    a) obtaining a three-dimensional tomographic digital image of the material sample;
    b) generating a preliminary segmented volume corresponding to the material sample by processing the three-dimensional tomographic digital image through a segmentation process;
    c) obtaining a criterion relation developed independently of the preliminary segmented volume as a function of values of criterion properties related to the target property;
    d) creating an adjusted segmented volume through additional revising features to the preliminary segmented volume, comprising:
        1) applying a processing step to identify locations for potentially revising features of the preliminary segmented volume;
        2) applying revision features to the preliminary segmented volume to create a revised segmented volume;
        3) deriving trial values of criteria properties from the revised segmented volume;
        4) repeating at least steps 2)-3) on the revised segmented volume until trial values of criterion properties satisfy the criterion relation; and
    e) deriving a final value for the target property from the adjusted segmented volume.

2. The method of claim 1, wherein the values of criterion properties are values of a pair of criterion properties.

3. The method of claim 1, wherein the obtaining a three-dimensional tomographic digital image of the material sample comprises scanning the material sample with at least one of a group comprising: focused ion beam scanning electron microscope, X-ray computed tomography, and magnetic resonance imaging.

4. The method of claim 1, wherein the obtaining of the preliminary segmented volume corresponding to the material sample comprises processing the three-dimensional tomographic digital image to a plurality of phases for producing the preliminary segmented volume as comprised of voxels characterized as either pore space or solid material phase.

5. The method of claim 1, wherein:
    a) the revising of features comprises adding cracks;
    b) the applying of a processing step to identify locations for potentially revising features of the preliminary segmented volume further comprises:
        1) creating an inverse distance map of the pore space to the solid material phase boundaries in the preliminary segmented volume; and
        2) applying a watershed processing step for identifying positions for potentially introducing cracks into the solid material phase as a function of the inverse distance map; and
    c) the obtaining of a criterion relation developed independently of the preliminary segmented volume as a function of a pair of criterion properties related to the target property further comprises defining the criterion relationship using one or more of a group comprising: calculating a theoretical criterion relationship based on a theoretical material physics model, employing an empirical transform, and deriving a relationship from a number of data points relevant to the material sample;
    d) the creating of an adjusted segmented volume through additional revising features to the preliminary segmented volume further comprises revising the adjusted segmented volume until the associated values for the pair of criterion properties satisfies the criterion relation, and further comprises:
        (1) obtaining a characteristic grey-scale value of the pore space,
        (2) applying an iterative watershed cut-off value; comprising:
            i) selecting a watershed grey-scale cut-off value;
            ii) finding all candidate voxels in the three-dimensional tomographic digital image which have their grey-scale value between the characteristic grey-scale value of the pore space and the iterative watershed cut-off value;
            iii) finding among those candidate voxels the voxels to be realized which are co-located with potential locations for introducing cracks identified in the watershed surface; and
            iv) converting the voxels identified to be realized in the segmented volume to voxels representing pore space;
            v) deriving trial values for criterion properties from an analysis of the revised segmented volume; and
            vi) comparing the trial values for the criterion properties with the criterion relationship, adjusting the grey-scale watershed cut-off for reallocating pore space and iteratively repeating steps ii) to vi) until the trial values satisfy the criterion relationship.

6. The method of claim 2, wherein:
    a) the material sample comprises a rock sample;
    b) the pair of criterion properties comprise porosity and a select elastic property; and c) the target property is selected from a group comprising: absolute permeability, relative permeability, capillary pressure, and electrical resistivity.

7. The method for increasing the accuracy of the target property value in accordance with claim 1 further comprising populating the adjusted segmented volume with additional properties, and using a resulting segmented volume to derive additional properties of interest from the adjusted segmented volume.

8. The method of claim 1, wherein step 4) comprises repeating steps 1)-3) on the revised segmented volume until trial values of criterion properties satisfy the criterion relation.

9. The method of claim 1, further comprising storing the adjusted segmented volume created in step d).

10. A method for increasing the accuracy of a target property value derived from a digital image representing a porous material sample, comprising:
  a) obtaining a three-dimensional tomographic digital image comprising a grey-scale volume of the sample;
  b) obtaining a segmented volume representing the sample by processing the grey-scale volume to pore space and a plurality of solid material phases through a segmentation process;
  c) obtaining a criterion relationship developed independently of the segmented volume as a function of a pair of criterion properties related to the target property;
  d) creating an adjusted segmented volume through additional processing, comprising:
    1) determining where to add a plurality of cracks to the segmented volume, comprising:
      i) creating an inverse distance map of the pore space to the solid material phase boundaries in the segmented volume;
      ii) creating a watershed surface identifying locations for potentially introducing cracks into the solid material phases by applying a watershed processing step to said inverse distance map;
      iii) selecting potential crack locations as all portions of the watershed surface located in the solid phases of the segmented volume;
    2) selecting a value for degree of volume revision;
    3) producing a revised segmented volume, comprising:
      I) selecting a portion of potential crack locations guided by degree of revision value;
      II) converting the voxels of the segmented volume which are located on said selected portion of potential crack locations from solid phases to pore;
    4) deriving the values of criterion properties from the analysis of the revised segmented volume;
    5) repeating at least the steps 3 through 4 by varying the selected degree of volume revision until the values of said criterion properties derived in step 4 satisfy the criterion relationship;
    6) selecting the revised segmented volume which produced the set of criterion properties which satisfy the criterion relationship best, as the adjusted segmented volume; and
  e) using the adjusted segmented volume to derive the target property value.

11. The method of claim 10, wherein obtaining the three-dimensional tomographic digital image of the sample comprises using at least one of a group comprising: a focused ion beam scanning electron microscope, X-ray computed tomography, and magnetic resonance imaging.

12. The method of claim 10, wherein the target property value comprises a value selected from a group of properties comprising: absolute permeability, relative permeability, capillary pressure, electrical resistivity and select elastic properties; and
  wherein the porous material sample is a rock sample.

13. The method of claim 10, wherein:
  a) the target property comprises a value selected from a group comprising: absolute permeability, relative permeability, capillary pressure, and electrical resistivity; and
  b) the pair of criterion properties are a select elastic property and porosity.

14. The method of claim 13, wherein the select elastic property is an elastic wave velocity $V_p$.

15. The method of claim 13, wherein obtaining the criterion relationship independent of the digital volume comprises one or more of a group comprising:
  calculating a theoretical criterion relationship based on a theoretical rock physics model, employing an empirical velocity-porosity transform, and deriving a relationship from a number of data points relevant to the rock sample.

16. The method of claim 13, wherein deriving the values of selected elastic property utilizes replacing all mineral phases in adjusted segmented volume by one selected mineral, for which the criterion relation can be obtained.

17. The method of claim 16, wherein the selected mineral is one of quartz, calcite, or dolomite.

18. The method of claim 10, further comprising:
  a) obtaining, after step c) and before step d), characteristic grey-scale value of the voxels of the grey-scale volume located in the pore space of the said segmented volume; and
  b) wherein (1) the selecting of a degree of volume revision comprises selecting a grey-scale value larger than said characteristic grey-scale value of the pore space; and (2) the selecting of a portion of potential crack locations guided by degree of revision value comprises selecting those voxels of potential crack locations, whose grey-scale value in the grey-scale volume is smaller than the degree of volume revision 19. The method of claim 10, wherein:
  a) the sample of a porous media comprises a rock sample; and
  b) the target property is selected from a group comprising: absolute permeability, relative permeability, capillary pressure, and electrical resistivity.

20. A method for increasing the accuracy of a target property value derived from a digital image representing a rock sample, comprising:
  a) obtaining a grey-scale digital volume of the rock sample;
  b) obtaining a preliminary segmented volume of the rock sample by processing the grey-scale volume to a plurality of pore spaces and at least one solid material phase separated through a segmentation process;
  c) defining a criterion curve developed independently of the preliminary segmented volume as a function of a pair of criterion properties related to the target property;
  d) creating an adjusted segmented volume through additional processing, comprising:
    1) determining where to add a plurality of cracks to the preliminary segmented volume, comprising:
      i) creating an inverse distance map of the pore space to the solid material phase boundaries in the preliminary segmented volume;
      ii) applying a processing step identifying locations for potentially introducing cracks into the solid material phase as a function of the inverse distance map;

2) introducing cracks to the preliminary segmented volume until the adjusted segmented volume associated with values for the pair of criterion properties that satisfies the criterion curve to produce an adjusted segmented volume;

e) producing and storing an improved segmented volume incorporating the cracks realized in the identified adjusted segmented volume; and f) using the improved segmented volume to derive a final value for the target property.

21. The method of claim 20, wherein absolute permeability is the target property and wherein the identified adjusted segmented volume is the improved segmented volume.

22. The method of claim 20, wherein the target property is related to pore space connectivity and obtaining a grey-scale image of the rock sample comprises scanning the rock sample under circumstances in which resolution available in an initial digital image is insufficient to effectively directly capture data accurately representing total pore space connectivity.

23. The method of claim 20, wherein determining the degree to which cracks are to be realized further comprises:
   a) selecting an initial grey-scale watershed cut-off for reallocating pore space in the revised segmented volume higher than present in the rock sample,
   b) incrementally adjusting the grey-scale watershed cut-off for reallocating pore space wherein the adjusting proceeds incrementally from low to high.

24. The method of claim 20, further comprising deriving a preliminary value from the preliminary segmented volume and comparing the preliminary target value with expectations developed independent of the preliminary segmented volume.

25. A method for developing an adjusted absolute permeability value from a segmented volume created from tomographic image data obtained at a resolution insufficient to effectively resolve pore space connectivity directly from a rock sample under investigation, said method comprising:
   a) obtaining a segmented volume representing the rock sample segmented to pore spaces and solid material phase, comprising:
      1) scanning the rock sample to produce a grey-scale image; and
      2) segmenting the grey-scale image to produce a segmented volume composed of voxels representing pore space and voxels representing at least one solid material phase;
   b) obtaining a grey-scale value characterizing pore space;
   c) obtaining a grey-scale value characterizing solid material;
   d) defining a criterion curve developed independently of the segmented volume as a function of a select elastic property and porosity;
   e) creating an inverse distance map of the pore space to the solid material phase boundary from the segmented volume;
   f) creating a watershed surface by applying a watershed process to the inverse distance map to identify potential locations for introducing cracks;
   g) producing a revised segmented volume based upon a given degree of revision; comprising:
      1) selecting a watershed grey-scale cut-off value;
      2) finding all voxels in the grey-scale digital volume which have their grey-scale value between the grey-scale value of the pores and the watershed cut-off value;
      3) finding among those voxels the voxels co-located with potential locations for introducing cracks identified by the watershed process; and
      4) converting the corresponding voxels of the segmented volume to voxels representing pore space;
   h) deriving trial values for the select elastic property and porosity from an analysis of the revised segmented volume;
   i) comparing the trial values for the select elastic property and porosity with the criterion curve, adjusting the grey-scale watershed cut-off for reallocating pore space and iteratively repeating steps e)-i) until trial values satisfy the criterion curve and before proceeding to step j;
   j) producing and storing an improved segmented volume incorporating the cracks of the adjusted segmented volume; and
   k) using the improved segmented volume to derive the final absolute permeability value.

26. The method of claim 25, wherein obtaining the grey-scale image of the rock sample comprises using one or more from a group comprising: focused ion beam scanning electron microscope, X-ray computed tomography, and magnetic resonance imaging.

27. The method of claim 26, wherein defining the criterion curve independent of the digital volume comprises one or more from a group comprising: calculating a theoretical criterion curve based on a theoretical rock physics model, employing an empirical velocity-porosity transform, and deriving a curve from a number of data points relevant to the rock sample.

28. The method of claim 27, wherein defining the criterion curve independent of the segmented volume further comprises an analysis based on an assumption that all that is not pore is a single pure mineral and wherein the step of deriving trial values from the digital volume applies the same assumption and mineral.

29. The method of claim 28, wherein selecting an initial grey-scale watershed cut-off for reallocating pore space comprises selecting a grey-scale watershed cut-off for producing pore space in the revised segmented volume higher than grey-scale value characterizing the pore space, and wherein incrementally adjusting the grey-scale watershed cut-off thereafter for reallocating pore space comprises bracketing with a low value and incrementally increasing the grey-scale watershed cut-off.

30. The method of claim 29, wherein using the segmented volume associated with the trial values satisfying the criterion curves to derive the adjusted absolute permeability value further comprises deriving the final absolute permeability values in all three directions of the segmented volume.

31. A method for increasing the accuracy with which a segmented volume represents a material sample having sub-resolution structure, comprising:
   a) obtaining a grey-scale 3-D digital image of the sample;
   b) obtaining a preliminary segmented volume corresponding to the sample by processing the grey-scale image through a segmentation process;
   c) defining a criterion relation developed independently of the segmented volume as a function of a pair of criterion properties related to a target property;
   d) creating an adjusted segmented volume through additional processing, comprising:
      1) applying a processing step identifying locations for potentially revising structural features of the segmented volume; and
      2) determining the degree to which revisions to structural features are to be realized in revising the segmented volume by identifying the adjusted segmented volume associated with values for the pair of criterion properties that satisfies the criterion relation; and e) storing the revised structural features of the identified adjusted segmented volume for use in further digital rock physics applications.

32. The method of claim 31, wherein obtaining a grey-scale image of the sample comprises scanning the sample with at least one of the following: focused ion beam scanning electron microscope, X-ray computed tomography, and magnetic resonance imaging.

33. The method of claim 32, wherein obtaining a segmented volume corresponding to the sample by processing the grey-scale image to a plurality of phases comprises producing the segmented volume composed of voxels characterized as either pore space or solid material phase.

34. The method of claim 33, wherein the material sample is rock and wherein:
a) revising features comprises adding cracks;
b) applying a watershed processing step identifying locations for potentially revising features of the segmented volume further comprises:
  1) creating an inverse distance map of the pore space to the solid material phase boundaries in the segmented volume; and
  2) applying a processing step for identifying positions for potentially introducing cracks into the solid material phase as a function of the inverse distance map; and
c) defining a criterion relation developed independently of the segmented volume as a function of a pair of criterion properties related to the target property further comprises:
  1) expressing the criterion relation as a criterion curve; and
  2) defining the criterion curve, comprises using one or more of a group comprising: calculating a theoretical criterion curve based on a theoretical rock physics model, employing an empirical transform, or deriving a relationship from a number of data points relevant to the rock sample;
d) determining the degree to which features are to be realized in revising the segmented volume by identifying an adjusted segmented volume associated with values for the pair of criterion properties that satisfies the criterion relation further comprises:
  1) obtaining characteristic grey-scale value of the pore space
  (2) applying an iterative watershed cut-off value; comprising:
    i) finding all voxels in the grey-scale image which have their grey-scale value between the characteristic grey-scale value of the pores and the iterative watershed cut-off value;
    ii) finding among those voxels the voxels co-located with potential locations for introducing cracks identified in the watershed surface;
    iii) converting the corresponding voxels of the segmented volume to voxels representing pore space;
    iv) deriving trial values for the select elastic property and porosity from an analysis of the revised segmented volume; and
    v) comparing the trial values for the select elastic property and porosity with the criterion curve, adjusting the grey-scale watershed cut-off for reallocating pore space and iteratively repeating steps d)(2)i) to d)(2)v) until the trial values satisfy the criterion curve.

35. The method of claim 34, wherein the pair of criterion properties comprise porosity and a select elastic property.

36. The method of claim 35, further comprising using the revised structural features of the identified adjusted segmented volume to derive a value for the target property which is selected from a group of properties comprising: absolute permeability, relative permeability, capillary pressure, and electrical resistivity.

37. The method of claim 36, further comprising using the revised structural features of the identified adjusted segmented volume to derive a value for at least one other the fluid flow property.

38. The method of claim 37, further comprising combining the revised structural features of the identified adjusted segmented image with data from at least one other segmented image.

39. The method of claim 38, wherein at least one of the other segmented images with which the revised structural features are combined has a plurality of solid material phases.

40. A system for increasing the accuracy of a target property value derived from a digital image corresponding to a material sample, comprising:
a) an X-ray scanner operable to scan a rock sample to obtain a three-dimensional tomographic digital image of the rock sample; and
b) one or more computer systems operable to i) obtain a three-dimensional tomographic digital image of the material sample; ii) generate a preliminary segmented volume corresponding to the material sample by processing the three-dimensional tomographic digital image through a segmentation process; iii) obtain a criterion relation developed independently of the preliminary segmented volume as a function of values of criterion properties related to the target property; iv) create an adjusted segmented volume through additional revising features to the preliminary segmented volume, comprising: 1) apply a processing step to identify locations for potentially revising features of the preliminary segmented volume; 2) apply revision features to the preliminary segmented volume to create a revised segmented volume; 3) derive trial values of criteria properties from the revised segmented volume; 4) repeat at least steps 2)-3) on the revised segmented volume until trial values of criterion properties satisfy the criterion relation; v) store an adjusted segmented volume incorporating the revised features of the adjusted segmented volume identified; vi) derive a final value for the target property from the adjusted improved segmented volume; and vii) output the results to at least one device to display, print, or store results of the computations; and
c) at least one device to display, print, or store results of the computations.

41. A computer program product on a non-transitory computer readable medium that, when performed on a processor in a computerized device provides a method for performing computations of one or more or all of the indicated steps of the method of claim 1.

* * * * *